(12) United States Patent
Kim et al.

(10) Patent No.: US 12,474,871 B2
(45) Date of Patent: Nov. 18, 2025

(54) MEMORY MODULE FOR PERFORMING ONE-TIME PROGRAMMABLE (OTP) ADDRESSING OPERATION TO STORE UNIQUE ID OF EACH MEMORY DEVICE IN AN ID STORGE REGION OF EACH MEMORY DEVICE, AND STORAGE DEVICE INCLUDING THE SAME

(71) Applicant: SAMSUNG ELECTRONICS CO., LTD., Suwon-si (KR)

(72) Inventors: Ki-Heung Kim, Suwon-si (KR); Taeyoung Oh, Suwon-si (KR); Taekwoon Kim, Suwon-si (KR); Jinseong Yun, Suwon-si (KR); Yoonjae Jeong, Suwon-si (KR); Hyongryol Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/590,324

(22) Filed: Feb. 28, 2024

(65) Prior Publication Data
US 2024/0289058 A1   Aug. 29, 2024

(30) Foreign Application Priority Data

Feb. 28, 2023   (KR) .................. 10-2023-0027347
May 31, 2023   (KR) .................. 10-2023-0069866

(51) Int. Cl.
G06F 3/06   (2006.01)
(52) U.S. Cl.
CPC .......... *G06F 3/0659* (2013.01); *G06F 3/0604* (2013.01); *G06F 3/0683* (2013.01)

(58) Field of Classification Search
CPC ............ G06F 12/1491; G06F 12/1466; G06F 3/0659; G06F 3/0604; G06F 3/0683;
(Continued)

(56) References Cited

U.S. PATENT DOCUMENTS 5,812,814 A   9/1998 Sukegawa
8,612,774 B2   12/2013 Dellow
(Continued)

FOREIGN PATENT DOCUMENTS

JP   2006-338773 A   12/2006

OTHER PUBLICATIONS

Dataplant: Enhancing System Security with Low-Cost In-DRAM Value Generation Primitives, L. Orosa, Y. Wang, J. Gomez-Luna, J. Kim, ResearchGate (Year: 2019).*
(Continued)

*Primary Examiner* — Khoa D Doan
(74) *Attorney, Agent, or Firm* — Sughrue Mion, PLLC

(57) ABSTRACT

A method of operating a memory module that communicates with a memory controller includes: entering a one-time programmable (OTP) addressing mode based on an OTP command received from the memory controller; determining whether a guard key sequence is satisfied based on a plurality of mode register commands received from the memory controller; and programming, based on a determination that the guard key sequence is satisfied, a unique identifier (ID), corresponding to a target memory device, into the target memory device, among a plurality of memory devices included in the memory module.

20 Claims, 25 Drawing Sheets

(58) Field of Classification Search
CPC .......... G11C 17/16; G11C 17/18; G11C 7/24;
G11C 7/1045; G11C 29/781; G11C 8/12;
G11C 5/04; G11C 2029/4402
See application file for complete search history.

(56) References Cited

U.S. PATENT DOCUMENTS

| | | |
|---|---|---|
| 10,521,618 B1 | 12/2019 | Zhang et al. |
| 10,713,137 B2 | 7/2020 | Kim et al. |
| 10,803,969 B1 | 10/2020 | Bell et al. |
| 10,891,243 B2 | 1/2021 | Morris et al. |
| 10,978,170 B2 | 4/2021 | Lee et al. |
| 2006/0265556 A1* | 11/2006 | Janzen ............... G11C 11/4091 365/222 |
| 2013/0297852 A1* | 11/2013 | Fai ..................... G06F 3/0659 711/E12.008 |
| 2016/0335196 A1* | 11/2016 | Kumar ................ G06F 3/0673 |
| 2017/0048070 A1* | 2/2017 | Gulati ................. H04L 9/3268 |
| 2017/0125119 A1 | 5/2017 | Loh et al. |
| 2019/0129879 A1 | 5/2019 | Gonzalez et al. |
| 2020/0301590 A1* | 9/2020 | Bell ................... G06F 12/1441 |
| 2022/0276958 A1 | 9/2022 | Sethuraman et al. |

OTHER PUBLICATIONS

Communication dated Mar. 15, 2024, issued by the European Patent Office in counterpart European Application No. 24153781.0.
Neal et al. "Micron® DDR5: Key Module Features," Micron Technical Brief, Jul. 2020, total 3 pages, XP093134371.

\* cited by examiner

FIG. 8

| Guard keys | OP[7] | OP[6] | OP[5] | OP[4] | OP[3] | OP[2] | OP[1] | OP[0] |
|---|---|---|---|---|---|---|---|---|
| MR24 seq1 | 1 | 1 | 0 | 0 | 1 | 1 | 1 | 1 |
| MR24 seq2 | 0 | 1 | 1 | 1 | 0 | 0 | 1 | 1 |
| MR24 seq3 | 1 | 0 | 1 | 1 | 1 | 0 | 1 | 1 |
| MR24 seq4 | 0 | 0 | 1 | 1 | 1 | 0 | 1 | 1 |

[Guard key encoding]

FIG. 10

| | CS_n | CA0 | CA1 | CA2 | CA3 | CA4 | CA5 | CA6 |
|---|---|---|---|---|---|---|---|---|
| ACT | L | L | L | V | V | V | V | V |
| | H | ID0 | ID1 | ID2 | ID3 | ID4 | ID5 | ID6 |

| | CS_n | CA7 | CA8 | CA9 | CA10 | CA11 | CA12 | CA13 |
|---|---|---|---|---|---|---|---|---|
| ACT | L | V | V | V | V | CID0 | CID1 | CID2/DDPID |
| | H | ID7 | V | V | V | V | V | CID3/R17 |

[ID of memory device]

FIG. 19

| CS_n | CA0 | CA1 | CA2 | CA3 | CA4 | CA5 | CA6 |
|---|---|---|---|---|---|---|---|
| L | L | L | V | V | V | V | V |
| H | 1 | 0 | 0 | 0 | 1 | TBD | TBD |

| CS_n | CA7 | CA8 | CA9 | CA10 | CA11 | CA12 | CA13 |
|---|---|---|---|---|---|---|---|
| L | V | V | V | V | CID0 | CID1 | CID2/DD PID |
| TBD | ID7 | V | V | V | V | V | CID3/R17 |

ACT

[ID of memory device]

MEMORY MODULE FOR PERFORMING ONE-TIME PROGRAMMABLE (OTP) ADDRESSING OPERATION TO STORE UNIQUE ID OF EACH MEMORY DEVICE IN AN ID STORGE REGION OF EACH MEMORY DEVICE, AND STORAGE DEVICE INCLUDING THE SAME

CROSS-REFERENCE TO RELATED APPLICATION(S)

This U.S. non-provisional application is based on and claims priority under 35 USC § 119 to Korean Patent Application Nos. 10-2023-0027347, filed on Feb. 28, 2023, and 10-2023-0069866, filed on May 31, 2023, in the Korean Intellectual Property Office, the disclosures of which are herein incorporated by reference in their entireties.

BACKGROUND

Example embodiments relate to a memory module and a storage device including the same.

Memory devices are used to store data, and are classified into volatile memory devices and nonvolatile memory devices. As an example of a nonvolatile memory device, a flash memory device may be used in a mobile phone, a digital camera, a mobile computer device, a stationary computer device, or the like.

A memory module includes a plurality of memory devices. In general, identifiers (IDs) of a plurality of memory devices included in a memory module are assigned in a soft setting manner. For example, during power-up, IDs of a plurality of memory devices included in the memory module are set. However, according to such a soft setting manner, new IDs of a plurality of memory devices on a memory module are set again at every power-up.

SUMMARY

Example embodiments provide a storage device for permanently and safely storing a unique identifier (ID) of each of a plurality of memory devices included in a memory module.

According to an aspect of an example embodiment of the disclosure, provided is a method of operating a memory module that communicates with a memory controller, the method including: entering a one-time programmable (OTP) addressing mode based on an OTP command received from the memory controller; determining whether a guard key sequence is satisfied based on a plurality of mode register commands received from the memory controller; and programming, based on a determination that the guard key sequence is satisfied, a unique identifier (ID), corresponding to a target memory device, into the target memory device, among a plurality of memory devices included in the memory module.

In some embodiments, the programming the unique ID into the target memory device may include: receiving the unique ID of the target memory device together with a command from the memory controller; selecting the target memory device, among the plurality of memory devices, based on a data signal received from the memory controller; and programming the unique ID into an ID storage region of the target memory device.

In some embodiments, the programming the unique ID into the target memory device may include: receiving the unique ID of the target memory device, together with an active command, from the memory controller; receiving a write command from the memory controller; selecting the target memory device from among the plurality of memory devices based on a data signal received from the memory controller; and programming the unique ID into an ID storage region of the target memory device.

In some embodiments, the unique ID of the target memory device may be provided to the memory module from the memory controller by using a plurality of column addresses.

In some embodiments, the method may further include transmitting the unique ID, programmed into an ID storage region of the target memory device, to the memory controller.

In some embodiments, the memory controller and the memory module may be configured to communicate with each other through a plurality of different buses, and the unique ID, programmed into the ID storage region of the target memory device, may be transmitted to the memory controller through a sideband bus.

In some embodiments, the determining whether the guard key sequence is satisfied may include: continuously receiving the plurality of mode register commands from the memory controller; and determining whether an order and values of the plurality of mode register commands are the same as a predetermined order and predetermined values of the guard key sequence.

In some embodiments, the method may further include: exiting the OTP addressing mode after the programming the unique ID into the target memory device is completed; determining whether a memory device for which a unique ID has not been programmed is present, among the plurality of memory devices; and entering the OTP addressing mode with respect to the memory device, for which a unique ID has not been programmed, as a next target memory device.

In some embodiments, the method may further include: determining, as a next target memory device, a memory device for which a unique ID has not been programmed, among the plurality of memory devices, after the programming the unique ID into the target memory device is completed; and programming a unique ID, corresponding to the next target memory device, into the next target memory device.

In some embodiments, the method may further include: exiting the OTP addressing mode after programming a unique ID into each memory device of the plurality of memory devices is completed.

In some embodiments, the method may further include: transmitting information on unique IDs, respectively programmed into the plurality of memory devices, to the memory controller.

In some embodiments, the method may further include: transmitting information on the unique ID, programmed into the target memory device, to the memory controller after the programming the unique ID into the target memory device is completed.

In some embodiments, the method may further include: receiving a precharge command from the memory controller after the programming the unique ID into the target memory device is completed; and receiving a mode register write command after a predetermined time has passed from a time point at which the precharge command is received, wherein the transmitting the information on the unique ID, programmed into the target memory device, to the memory controller may be performed during the predetermined time.

In some embodiments, the memory controller and the memory module may be configured to communicate with each other through a sideband bus.

In some embodiments, a unique ID corresponding to the target memory device may be permanently programmed into an OTP region in the target memory device.

According to an aspect of an example embodiment of the disclosure, provided is a memory module that communicates with a memory controller, the memory module including: a register clock driver configured to receive a command from the memory controller; and a plurality of memory devices electrically connected to the register clock driver, wherein each memory device of the plurality of memory devices may include: a memory cell array including a plurality of memory cells; a command decoder configured to decode the command received from the memory controller; a mode register configured to store guard keys having a predetermined order, each guard key having a predetermined value; and an identifier (ID) storage region configured to, based on a match between an order and values of a plurality of mode register commands, received from the memory controller, and an order and values of the guard keys stored in the mode register, store information on the unique ID in the ID storage region.

In some embodiments, the information on the unique ID may be obtained based on a plurality of column addresses received from the memory controller.

In some embodiments, the ID storage region may include anti-fuse elements.

In some embodiments, each memory device of the plurality of memory devices may be configured to transmit the information on the unique ID, stored in the ID storage region, to the memory controller through a loopback operation.

According to an aspect of an example embodiment of the disclosure, provided is a storage device including: a memory module including a plurality of memory devices; a memory controller configured to control an operation of the memory module and configured to communicate with the memory module through a first bus; and a baseboard management controller configured to communicate with the memory module through a second bus and configured to monitor information on the memory module, wherein each memory device of the plurality of memory devices may include: a memory cell array including a plurality of memory cells; a command decoder configured to decode a command received from the memory controller; a mode register configured to store guard keys having a predetermined order, each guard key having a predetermined value; and an identifier (ID) storage region configured to, based on a match between an order and values of a plurality of mode register commands, received from the memory controller, and an order and values of the guard keys stored in the mode register, store the information on the unique ID in the ID storage region.

BRIEF DESCRIPTION OF DRAWINGS

The above and other aspects, features, and advantages of the present disclosure will be more clearly understood from the following detailed description, taken in conjunction with the accompanying drawings.

FIG. 8 is a diagram illustrating an example of a guard key sequence.

FIG. 10 is a diagram illustrating an example of a unique ID of a target memory device.

FIG. 19 is a diagram illustrating an example of transmitting information on a unique ID using a column address according to an example embodiment.

DETAILED DESCRIPTION

Hereinafter, example embodiments will be described with reference to the accompanying drawings.

Figure 1A:
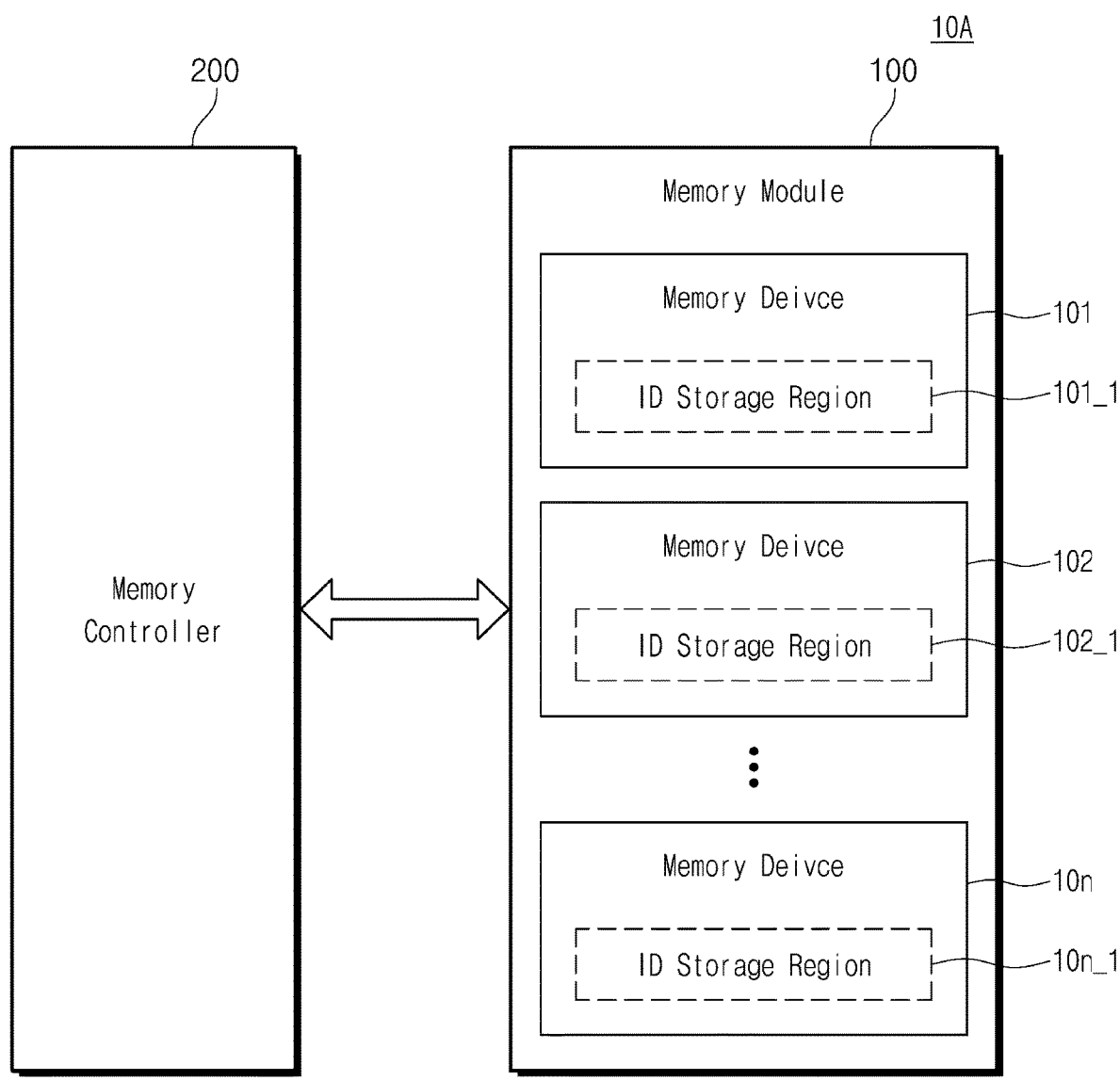
FIGS. 1A to 1C are block diagrams illustrating a storage device according to example embodiments.
Figure 1B:
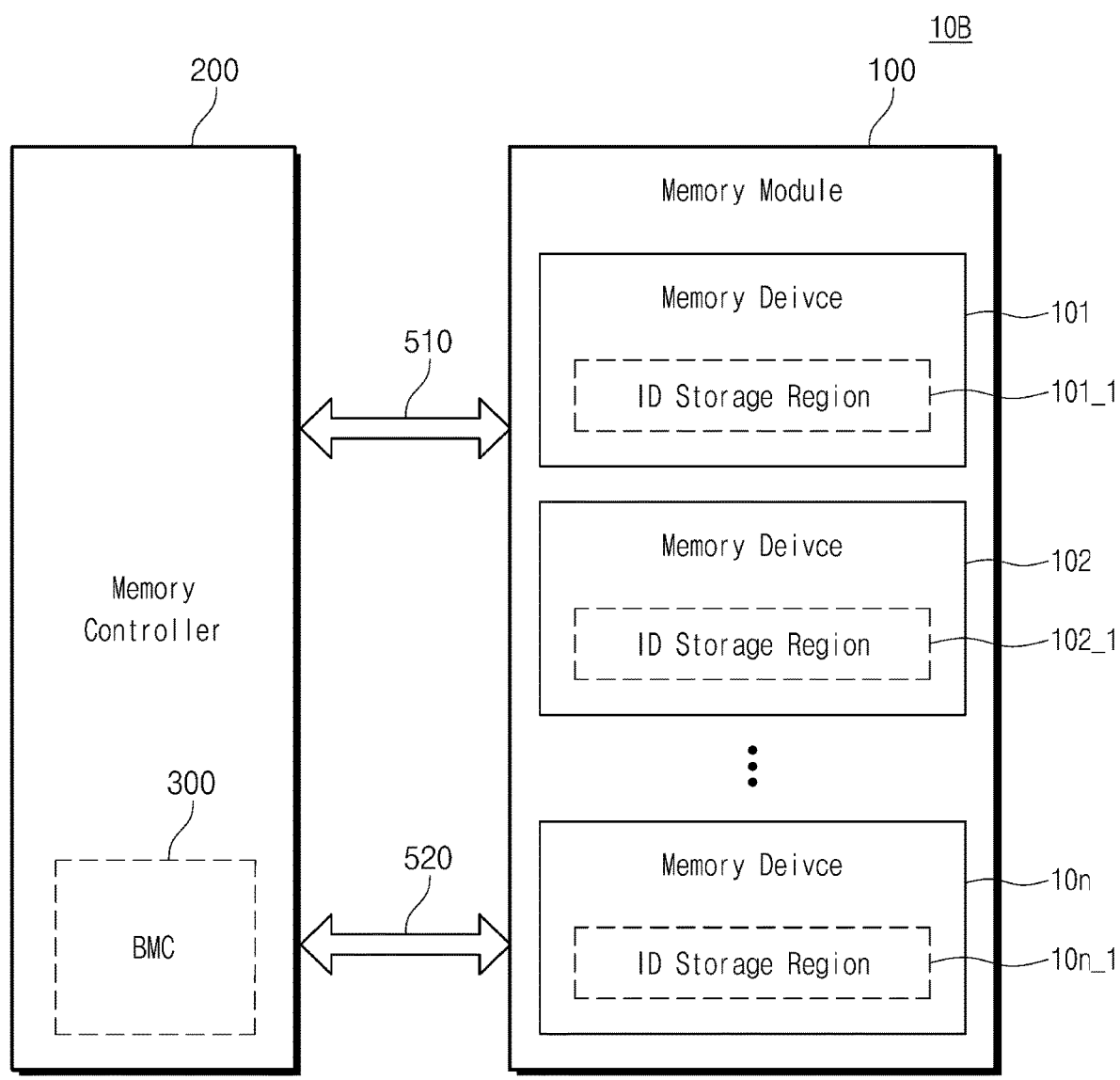
Figure 1C:
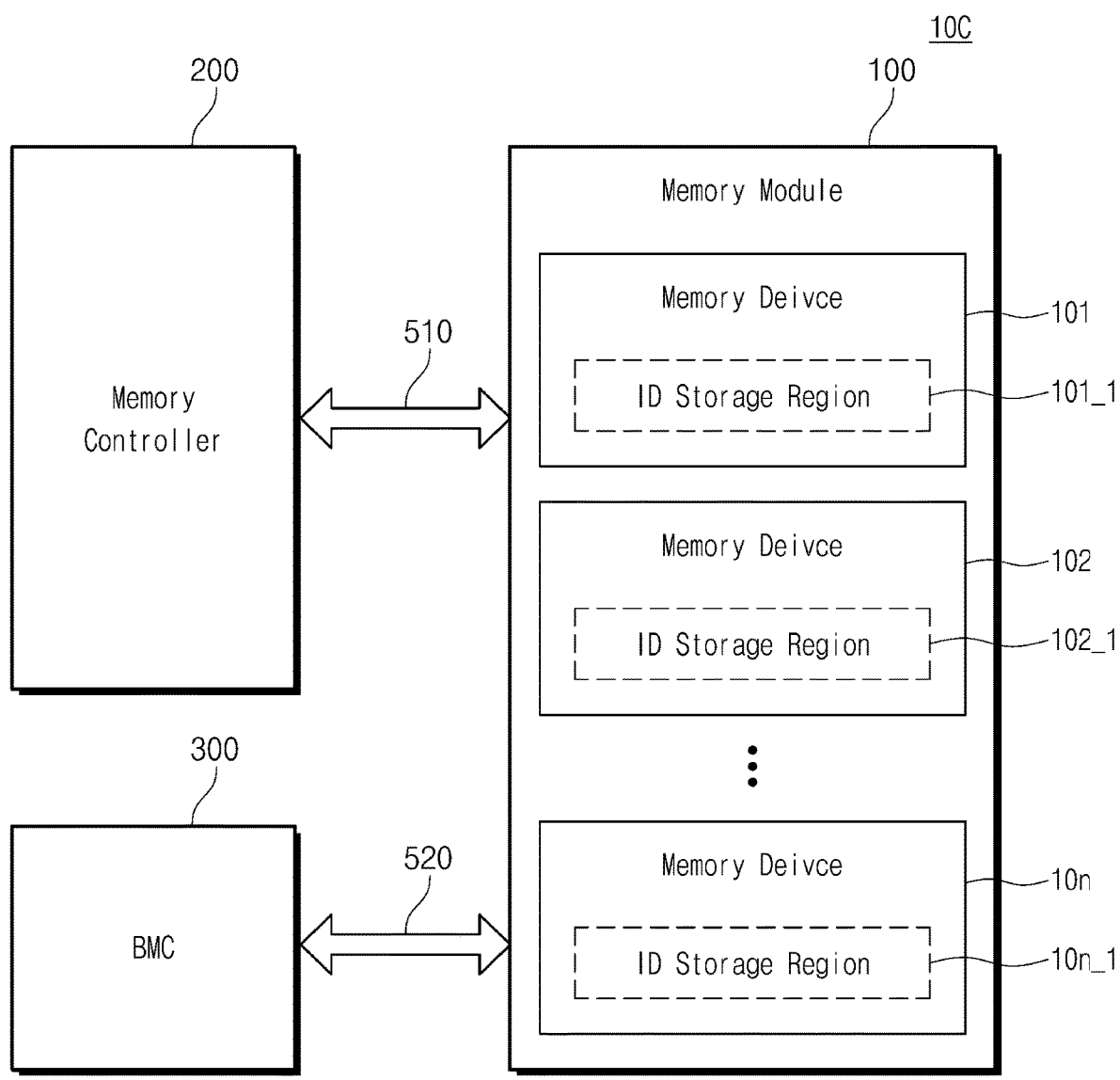

FIGS. 1A to 1C are block diagrams illustrating a storage device according to example embodiments. For example, FIG. 1A illustrates a storage device 10A according to an example embodiment, that permanently stores a unique identifier (ID) of a memory device, and FIGS. 1B and 1C illustrate storage devices 10B and 10C according to example embodiments, which each additionally support sideband communication.

Each of the storage devices 10A, 10B, and 10C according to example embodiment may include a memory module 100 and a memory controller 200. The memory controller 200 may set a unique ID for each of a plurality of memory devices 101, 102, . . . 10n included in the memory module 100, and the memory module 100 may permanently store a unique ID in an ID storage region of a corresponding memory device. In this case, the memory module 100 may store the unique ID in the ID storage region of the corresponding memory device only when commands transmitted from the memory controller 200 satisfy a guard key sequence. Accordingly, the unique ID of each of the plurality of memory devices 101 to 10n may be safely stored in the ID storage region of the corresponding memory device.

Referring to FIG. 1A, the storage device 10A may include a memory controller 200 and a memory module 100.

The memory controller 200 may control the memory module 100. For example, the memory controller 200 may control the memory module 100 based on a request of a processor that supports various applications such as a server application, a personal computer (PC) application, or a mobile application. For example, the memory controller 200 may be included in a host including a processor and may control the memory module 100 based on the request of the processor.

The memory controller 200 may transmit a command and/or an address to the memory module 100 to control the memory module 100. Also, the memory controller 200 may transmit data to the memory module 100 or receive data from the memory module 100.

The memory module 100 may receive data from the memory controller 200, and may store the received data. The memory module 100 may read the stored data in response to a request of the memory controller 200, and may transmit the read data to the memory controller 200.

In an example embodiment, the memory module 100 may be a dual in-line memory module (DIMM) that complies with the Joint Electron Device Engineering Council (JEDEC) standard. For example, but not limited to, the memory module 100 may be a registered DIMM (RDIMM), a load reduced DIMM (LRDIMM), an unbuffered DIMM (UDIMM), a fully buffered DIMM (FB-DIMM), or a small outline DIMM (SO-DIMM). However, example embodiments are not limited thereto, and the memory module 100 may be any other memory module such as a single in-line memory module (SIMM) or a memory module undefined in the JEDEC standard.

The memory module 100 may include a plurality of memory devices 101 to 10n. Each of the plurality of memory devices 101 to 10n may be implemented to store data transmitted from the memory controller 200.

In an example embodiment, each of the plurality of memory devices 101 to 10n may include any of various DRAM devices such as, for example but not limited to, a double data rate synchronous dynamic random access memory (DDR SDRAM), DDR2 SDRAM, DDR3 SDRAM, DDR4 SDRAM, DDR5 SDRAM, a low power double data rate (LPDDR) SDRAM, LPDDR2 SDRAM, LPDDR3 SDRAM, LPDDR4 SDRAM, LPDDR4X SDRAM, LPDDR5 SDRAM, a graphics double data rate synchronous graphics random access memory (GDDR SGRAM), GDDR2 SGRAM, GDDR3 SGRAM, GDDR4 SGRAM, GDDR5 SGRAM, and GDDR6 SGRAM. In an example embodiment, each of the plurality of memory devices 101 to 10n may include a memory device, in which multiple DRAM dies are stacked, such as a high bandwidth memory (HBM), HBM2, or HBM3. In an example embodiment, each of the plurality of memory devices 101 to 10n may include an SRAM, a NAND flash memory, a NOR flash memory, a resistive RAM (RRAM), a ferroelectric RAM (FRAM), a phase change RAM (PRAM), a thyristor RAM (TRAM), or an magnetic RAM (MRAM). In an example embodiment, the types of the plurality of memory devices 101 to 10n may be the same or different from each other.

In an example embodiment, the memory controller 200 may set a unique ID of each of the plurality of memory devices 101 to 10n. The plurality of memory devices 101 to 10n may include ID storage regions 101_1, 101_2, . . . 10n_1, respectively. A unique ID, set by the memory controller 200, may be stored in an ID storage region of a corresponding memory device.

The ID storage regions 101_1 to 10n_1 may be implemented as a nonvolatile memory such as a one-time programmable (OTP) memory. Accordingly, the unique ID of each of the plurality of memory devices 101 to 10n may be permanently stored in the ID storage region of the corresponding memory device.

The operation of storing the unique ID of each of the plurality of memory devices 101 to 10n in the ID storage region of the corresponding memory device may be referred to as a static addressing operation, an OTP static addressing operation, an OTP addressing operation, or the like. A unique ID may be referred to as a chip ID, a memory ID, a static ID, or the like.

In the case of a general memory module, IDs of a plurality of memory devices on the memory module are assigned in a soft setting manner. Accordingly, the IDs of the plurality of memory devices on the memory module are set anew at every power-up. This causes an increase in boot time of the memory module.

In contrast, the storage device 10A according to an example embodiment may permanently store the unique ID of each of the plurality of memory devices 101 to 10n in the ID storage region of the corresponding memory device. Accordingly, the storage device 10A does not need to set new IDs of the memory devices again at every power-up. As a result, the boot time may be reduced.

In an example embodiment, the memory module 100 may enter or verify a guard key sequence before storing a unique ID in a corresponding ID storage region. That is, the memory module 100 may determine whether the guard key sequence is satisfied based on the plurality of commands received from the memory controller 200. For example, the memory module 100 may determine that the guard key sequence is satisfied based on the plurality of commands received from the memory controller 200 matching a predetermined order and/or a setting value (or a pattern of setting values) of the guard key sequence. The memory module 100 may perform an operation of storing the unique ID in the ID storage region only when the plurality of commands received from the memory controller 200 match a predetermined order and/or a setting value (or a pattern of setting values) of the guard key sequence. Accordingly, the storage device 10A according to an example embodiment may safely store the unique ID of each of the plurality of memory devices 101 to 10n in the corresponding ID storage region.

Referring to FIGS. 1B and 1C, the storage devices 10B and 10C according to example embodiments may support sideband communication.

More specifically, the memory controller 200 and the memory module 100 according to an example embodiment may communicate with each other through at least two buses. For example, the memory controller 200 and the memory module 100 may communicate with each other through a first bus 510 and a second bus 520, as illustrated in FIGS. 1B and 1C.

The first bus 510 may be a bus used to perform general operations such as a write operation or a read operation. For example, a command, an address, and/or data used for a write operation or a read operation may be exchanged between the memory controller 200 and the memory module 100 through the first bus 510.

The second bus 520 may be a bus used to support sideband communication. For example, the second bus 520 may be a bus used to perform operations associated with security or telemetry management. For example, operations such as memory telemetry, authentication, management, and autonomous training may be performed through the second bus 520. The second bus 520 may be referred to as a memory module management communication bus associated with management of a memory module or a memory device, a memory I2C bus, an I3C bus, an improved inter integrated circuit bus, or an M3C bus.

In an example embodiment, sideband communication through the second bus 520 may be performed by a baseboard management controller (BMC) 300. For example, the memory controller 200 may include the BMC 300 and the BMC 300 may perform a telemetry management operation through the second bus 520, as illustrated in FIG. 1B. As another example, the BMC 300 may be implemented independently of the memory controller 200, as illustrated in FIG. 1C.

As described above, in the case in which the sideband communication is supported, the BMC 300 may continue to access the memory module 100 through the second bus 520 even when the processor is powered off. For example, each of the plurality of memory devices 101 to 10n according to example embodiments may permanently store a unique ID in an ID storage region. Accordingly, the BMC 300 may identify each of the plurality of memory devices 101 to 10n even when the memory controller 200 or the processor is powered off. As a result, the storage devices 10B and 10C according to example embodiments may efficiently perform a remote measurement management operation, or the like, on the memory devices 101 to 10n include in the memory module 100 even when the memory controller 200 or the processor is powered off.

As described above with reference to FIGS. 1A to 1C, the storage devices 10A, 10B, and 10C according to example embodiments may permanently and safely store a unique ID of each of the plurality of memory devices 101 to 10n included in the memory modules 100 in an ID storage region of a corresponding memory device.

Figure 2:
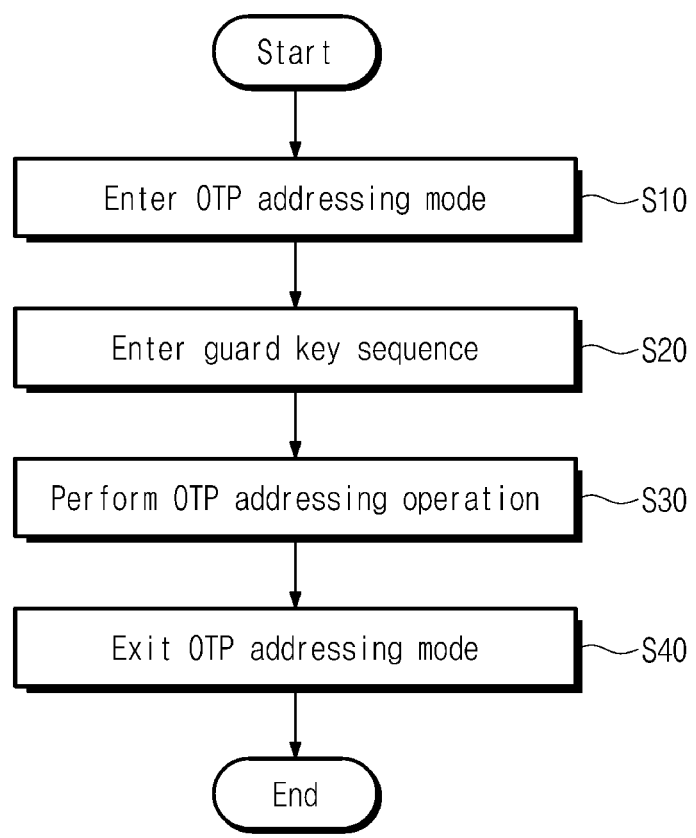
FIG. 2 is a flowchart illustrating an example of an operation of a storage device according to an example embodiment.

FIG. 2 is a flowchart illustrating an example of an operation of a storage device according to an example embodiment.

In operation S10, the storage device may enter or initiate an OTP addressing mode.

The OTP addressing mode may refer to a mode in which a unique ID of each of a plurality of memory devices included in a memory module is permanently stored in an ID storage region of a corresponding memory device. The OTP addressing mode may be referred to as, for example, an OTP mode, a static addressing mode, an OTP static addressing mode, or the like.

For example, when the memory controller 200 (see FIG. 1) transmits an OTP command to the memory module 100 (see FIG. 1), the storage devices 10A, 10B, 10C (see FIG. 1) may enter or initiate the OTP addressing mode. The OTP command may be defined using, for example, a mode register command. However, this is only an example, and the OTP command may be defined using a mode register setting command, a mode register writing command, or the like, or may be defined using other new command(s).

In operation S20, the storage device may enter or verify a guard key sequence.

The guard key sequence may be used to prevent a unique ID from being unintentionally stored in an ID storage region. For example, the guard key sequence may be used to protect security of the OTP addressing mode.

In an example embodiment, the guard key sequence may include a plurality of guard keys. The guard key may be referred to as a safety key, a mode register write (MRW) guard key, a sequential mode register write (MRW) guard key, a post package repair (PPR) guard key), and a hard post package repair (hPPR) guard key, or the like. According to example embodiments, a guard key and a guard key sequence may be interchangeably used.

In an example embodiment, immediately after entering or initiating the OTP addressing mode, the storage devices 10A, 10B, and 10C may enter or verify a guard key sequence.

In an example embodiment, the memory controller 200 may issue commands corresponding to a predetermined guard key sequence. For example, the guard key sequence may include a sequence of a plurality of mode register write commands (MRW), and the memory controller 200 may sequentially issue a plurality of mode register write commands matching an order and/or a setting value of a corresponding guard key sequence.

When the guard key sequence is interrupted by another mode register command and/or another non-mode register command (e.g., the plurality of mode register write commands issued by the memory controller 200 not satisfying the guard key sequence), the memory module 100 may exit the OTP addressing mode.

In operation S30, the storage device may perform an OTP addressing operation.

The OTP addressing operation may refer to an operation of programming a unique ID of a target memory device in an ID storage region of the target memory device. For example, the memory controller 200 may transmit a unique ID of a target memory device, among a plurality of memory devices 101 to 10n (see FIGS. 1A to 1C), to the memory module 100. Then, the memory module 100 may select (or identify) a target memory device, and may program a unique ID in an ID storage region of the selected target memory device.

In operation S40, the storage device may exit the OTP addressing mode.

As described above, the OTP addressing mode according to an example embodiment may allow a unique ID of each of the plurality of memory devices to be permanently and safely stored in the ID storage region of the corresponding memory device.

Figure 3A:
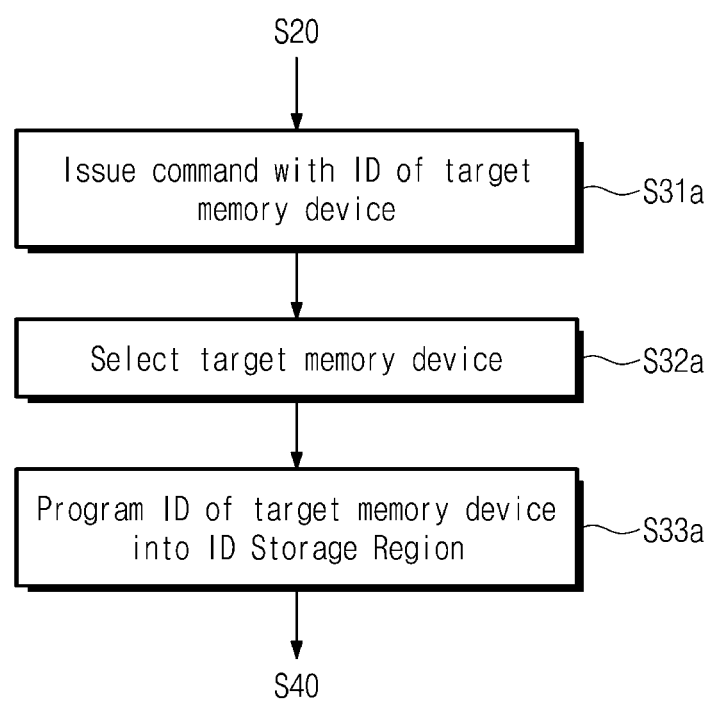
FIG. 3A is a flowchart illustrating an example of an one-time programmable (OTP) addressing operation according to an example embodiment.

FIG. 3A is a flowchart illustrating an example of an OTP addressing operation according to an example embodiment. The OTP addressing operation of FIG. 3A may correspond to operation S30 of FIG. 2.

In operation S31a, a command may be issued together with a unique ID of a target memory device.

For example, the memory controller 200 may transmit a non-mode register command or a mode register command to the memory module 100, and the memory module 100 may receive the non-mode register command or the mode register command.

In this case, according to an example embodiment, the memory controller 200 may transmit a unique ID of a target memory device to the memory module 100 together with a command. The memory module 100 may receive the unique ID together with a command.

In operation S32a, a target memory device may be selected.

For example, among a plurality of memory devices 101 to 10n, a target memory device may be selected using a data signal DQ.

In an example embodiment, the memory controller 200 may transmit a data signal DQ having a low level to the target memory device, and may transmit a data signal DQ having a high level to a memory device other than the target memory device. The memory module 100 may receive a data signal DQ from the memory controller 200, and may select a target memory device from among the plurality of memory devices 101 to 10n based on the received data signal DQ. In this case, the memory module 100 may select a memory device corresponding to the data signal DQ having a low level as a target memory device.

In an example embodiment, the memory controller 200 may transmit a data signal DQ having a high level to a target memory device, and may transmit a data signal DQ having a low level to a memory device other than the target memory device. The memory module 100 may receive a data signal DQ from the memory controller 200 and select a target memory device from among the plurality of memory devices 101 to 10n based on the received data signal DQ. In this case, the memory module 100 may select a memory device corresponding to the data signal DQ having a high level as the target memory device.

In operation S33a, a unique ID of the target memory device may be programmed in the ID storage region of the target memory device.

For example, the memory module 100 may program a unique ID corresponding to the target memory device in an ID storage region of the target memory device implemented as an OTP memory. Accordingly, the unique ID of the target memory device may be permanently programmed in the target memory device.

Figure 3B:
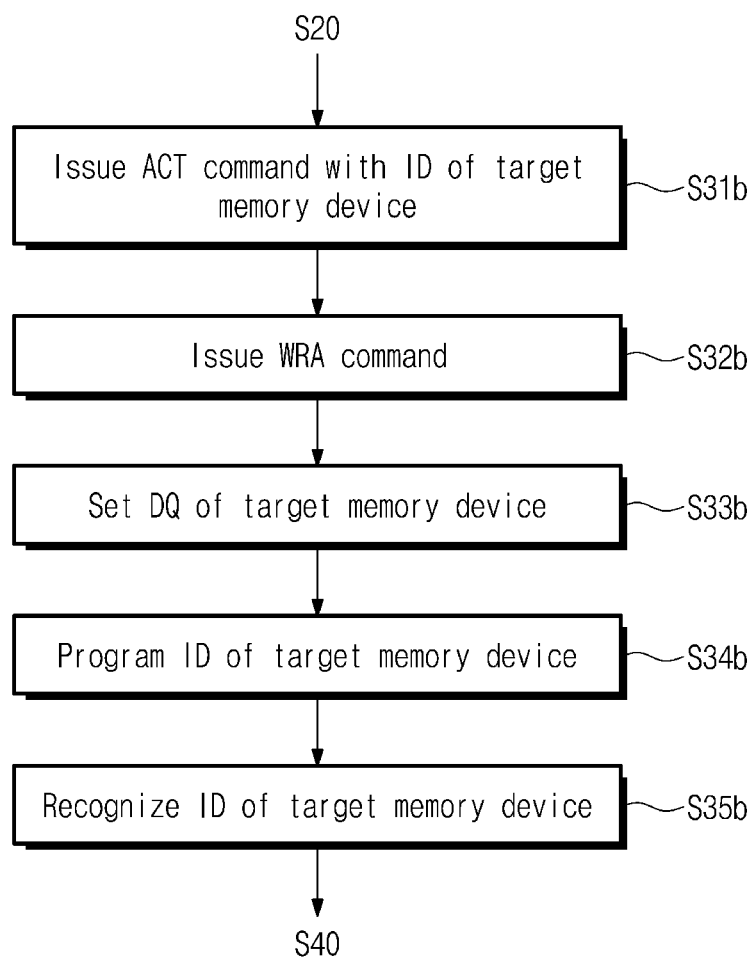
FIG. 3B is a flowchart illustrating an example of an OTP addressing operation according to an example embodiment.

FIG. 3B is a flowchart illustrating an example of an OTP addressing operation according to an example embodiment. The OTP addressing operation of FIG. 3B may correspond to operation S30 of FIG. 2.

In operation S31b, an active command ACT may be issued together with a unique ID of a target memory device.

For example, the memory controller 200 may transmit the active command ACT to the memory module 100. In this case, the memory controller 200 may also transmit the unique ID of the target memory device to the memory module 100. The memory module 100 may receive the active command ACT and the unique ID of the target memory device from the memory controller 200.

In operation S32b, a write command WRA may be issued.

For example, the memory controller 200 may transmit a write command WRA to the memory module 100. The memory module 100 may receive the write command WRA.

According to an example embodiment, the memory controller 200 may also transmit an address to the memory module 100. In this case, the memory module 100 may ignore the address transmitted together with the write command WRA.

In operation S33b, the data signal DQ of the target memory device may be set.

For example, the memory controller 200 may set the data signal DQ of the target memory device. The memory module 100 may receive the data signal DQ from the memory controller 200, and may select a target memory device based on the received data signal DQ.

In an example embodiment, the memory controller 200 may set the data signal DQ corresponding to the target memory device to a low level for a predetermined clock time, and may set data signals DQs corresponding to memory devices other than the target memory device (DQs) to a high level. The set data signals DQs may be transmitted to a corresponding memory module 100. The memory module 100 may receive the data signals DQs from the memory controller 200. The memory module 100 may select a memory device corresponding to a data signal DQ having a low level, among the plurality of memory devices 101 to 10n, as a target memory device.

In operation S34b, the unique ID of the target memory device may be programmed in the ID storage region of the target memory device.

For example, the memory module 100 may program the unique ID of the target memory device in the ID storage region of the target memory device. For example, the ID storage region may be an OTP region and, therefore, the unique ID of the target memory device may be permanently programmed in the ID storage region of the target memory device.

In operation S35b, the unique ID programmed in the target memory device may be checked.

For example, the memory module 100 may transmit a unique ID, programmed in the target memory device of the memory module 100, to the memory controller 200 through a loopback operation. Thus, the memory controller 200 may check the unique ID programmed in the target memory device.

In this case, the loopback operation is performed without an additional read command, such that the memory module 100 may rapidly transmit the unique ID programmed in the target memory device and the memory controller 200 may rapidly determine whether the unique ID is normally stored in the target memory device.

The operation of recognizing a unique ID programmed in the target memory device may be referred to as an OTP addressing recognition operation, an addressing recognition operation, a unique ID check operation, or the like.

As described above with reference to FIGS. 3A and 3B, a unique ID of each of a plurality of memory devices may be permanently stored in an ID storage region of a corresponding memory device through the OTP addressing operation according to an example embodiment.

Figure 4:
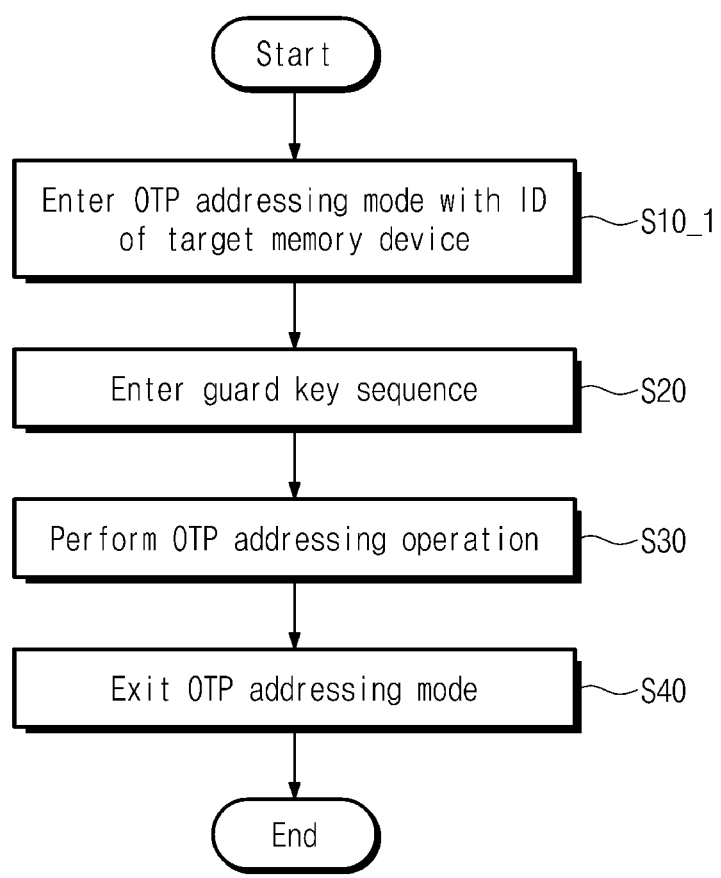
FIG. 4 is a flowchart illustrating an example of an operation of a storage device according to an example embodiment.

FIG. 4 is a flowchart illustrating an example of an operation of a storage device according to an example embodiment.

In FIGS. 2 to 3, the unique ID of the target memory device has been described as being transmitted to the memory module 100 together with a mode register command or a non-mode register command such as an ACT command. However, this is only an example and example embodiments are not limited thereto. Before the target memory device is selected by the data signal DQ, the unique ID of the target memory device may be transmitted to the memory module 100 at any time. For example, the unique ID of the target memory device may be transmitted to the memory module 100 when entering or initiating an OTP addressing mode, as illustrated in FIG. 4.

For example, referring to FIG. 4, in operation S10_1, the storage device may enter or initiate the OTP addressing mode. For example, when the memory controller 200 transmits an OTP command to the memory module 100, the storage device may enter or initiate the OTP addressing mode. In this case, the memory controller 200 may transmit the unique ID of the target memory device to the memory module 100 together with an OTP command. In operation S20, the storage device may enter or verify a guard key sequence. In operation S30, the storage device may perform an OTP addressing operation. In operation S40, the storage device may exit the OTP addressing mode.

As described above, a time point at which the unique ID of the target memory device is transmitted may vary according to example embodiments.

In FIGS. 2 and 3, the target memory device has been described as being selected using the data signal DQ. However, this is only an example and example embodiments are not limited thereto. For example, the target memory device may be selected using various other signals, commands, or addresses, other than the data signal DQ.

Figure 5:
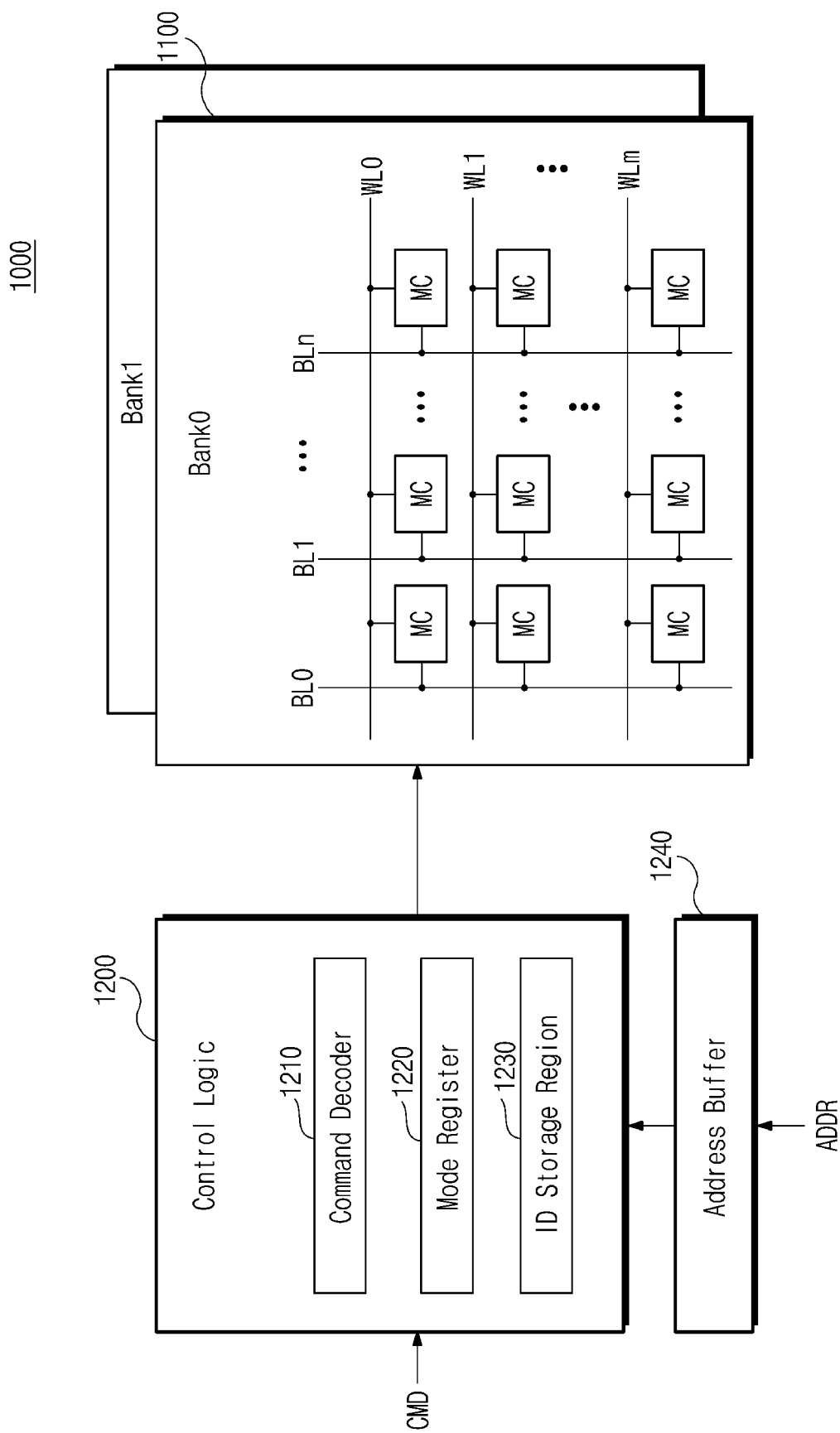
FIG. 5 is a block diagram illustrating an example of a memory device according to an example embodiment.

FIG. 5 is a block diagram illustrating an example of a memory device according to an example embodiment. A memory device 1000 of FIG. 5 may be any one of the memory devices 101 to 10n of the memory module 100 of FIGS. 1A to 1C.

Referring to FIG. 5, the memory device 1000 may include a control logic 1200, an address buffer 1240, and a memory cell array 1100.

The control logic 1200 may control an operation of the memory device 1000. The control logic 1200 may generate control signals such that the memory device 1000 performs a write operation or a read operation. Also, the control logic 1200 may generate control signals such that the memory device 1000 performs the OTP addressing mode according to an example embodiment. The control logic 1200 may include a command decoder 1210, a mode register 1220, and an ID storage region 1230.

The command decoder 1210 may decode a command CMD received from the memory controller 200 (see FIG. 1), and may generate an internal command signal corresponding to the command CMD. For example, the command decoder 1210 may receive an OTP command, an active command ACT, a write command, a precharge command, a mode register write command, or the like, and may decode each command to generate an internal command signal.

The mode register 1220 may store a setting value for an operation mode of the memory device 1000. The mode register 1220 may store a setting value for the OTP addressing mode. For example, the mode register 1220 may store a guard key sequence having a predetermined order and/or setting value.

The ID storage region 1230 may store a unique ID corresponding to the memory device 1000. For example, the ID storage region 1230 may be implemented as an OTP memory. Accordingly, the ID storage region 1230 may permanently store a unique ID of the memory device 1000.

For example, the ID storage region 1230 may be implemented as one of OTP memories such as an anti-fuse array, a mask read only memory (MROM), or an OTP programmable read only memory (OTP PROM). However, this is only an example. According to example embodiments, the ID storage region 1230 may be implemented as one of nonvolatile memories such as an e-fuse array, a NAND flash memory, a NOR flash memory, a magnetic random access memory (MRAM), a spin torque transfer-MRAM (STT-MRAM), a random access memory (ReRAM), or a phase change random access memory (PRAM).

The address buffer 1240 may receive an address signal, including a bank group address, a bank address, a row address, and a column address, from the memory controller 200. A write operation and a read operation may be performed on a memory cell MC in the memory cell array 1100 selected by the address signal.

The memory cell array 1100 may include one or more banks Bank0 and Bank1. Each of the banks Bank0 and Bank1 may include a plurality of memory cells MC connected to a plurality of wordlines WL0 to WLm and a plurality of bitlines BL0 to BLn. Data transmitted from the memory controller 200 may be stored in the plurality of memory cells MC.

Figure 6:
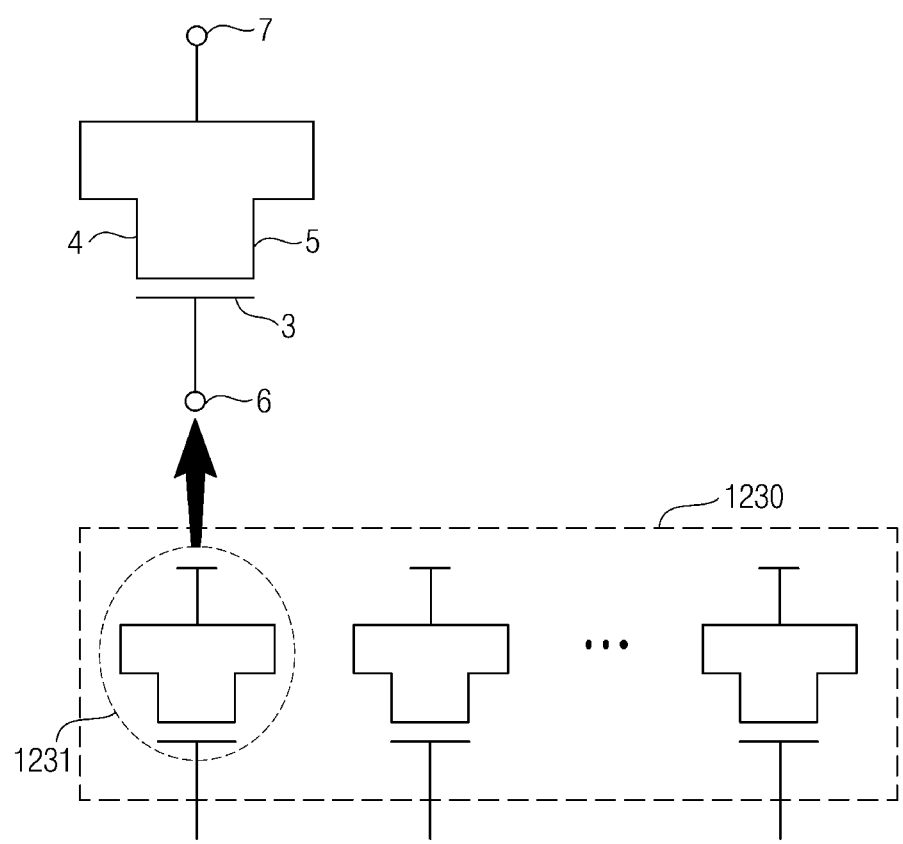
FIG. 6 is a diagram illustrating an example of an ID storage region of FIG. 5.

FIG. 6 is a diagram illustrating an example of the ID storage region 1230 of FIG. 5. As an example, FIG. 6 illustrates an example in which the ID storage region 1230 is implemented using an anti-fuse array.

Referring to FIG. 6, the ID storage region 1230 may be implemented as an anti-fuse array including a plurality of anti-fuses 1231.

The anti-fuses 1231 may be resistive elements having electrical characteristics opposite to those of fuse elements. The anti-fuses 1231 may have a high resistance value when they are not programmed, and may have a low resistance value when they are programmed.

In general, each of the anti-fuses 1231 may have a dielectric material between conductors. Each of the anti-fuses 1231 may be programmed by applying a relatively high voltage via the conductors disposed on opposite ends thereof to destroy the dielectric material between the conductors. By programming the anti-fuses 1231, the conductors disposed on the opposite ends of each of the anti-fuses 1231 may be short-circuited to cause the anti-fuses 1231 to have a relatively low resistance value.

For example, each of the anti-fuses 1231 may include a depletion-type MOS transistor in which a source 4 and a drain 5 are connected to each other. In an initial state, a resistance value between a first node 6 connected to a gate electrode 3 and a second node 7 commonly connected to the source 4 and the drain 5 may be significantly high because the first node 6 and the second node 7 are separated by a gate oxide layer. This state may be set to be an unprogrammed state.

A breakdown voltage may be applied between the first node 6 and the second node 7 to destroy the gate oxide layer of the anti-fuse 1231. When the gate oxide layer is destroyed, resistance between the first node 6 and the second node 7 may be decreased. This state may be set to be a programmed state.

As described above, the ID storage region 1230 according to an example embodiment may be implemented to include anti-fuses. The gate oxide layer of the anti-fuse may be destroyed during an OTP addressing operation to permanently program a unique ID of the memory device 1000 in the ID storage region 1230.

In FIG. 6, the ID storage region 1230 is illustrated as being an anti-fuse array of one column, including a plurality of anti-fuses, but example embodiments are not limited thereto. The ID storage region 1230 may include an anti-fuse array of one or more columns, and each anti-fuse may have a unique column address and a unique row address.

Figure 7:
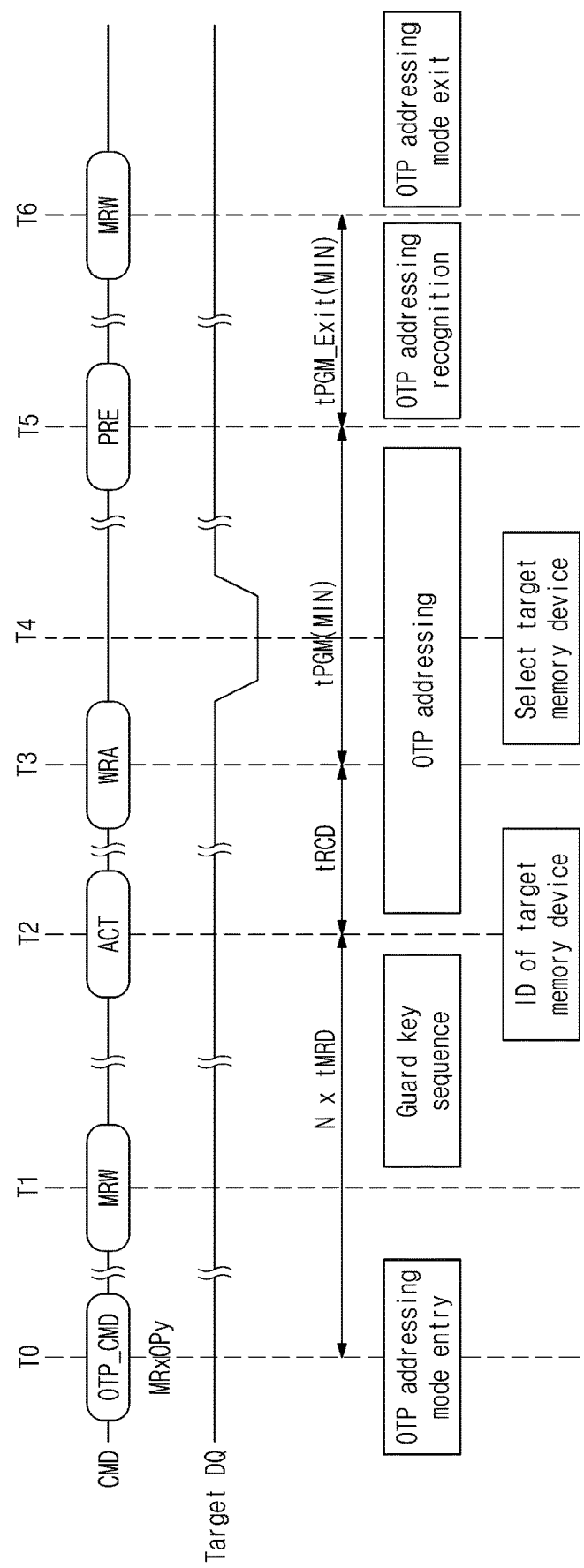
FIG. 7 is a timing diagram illustrating an example of an operation of a memory module in an OTP addressing mode.
Figure 9:
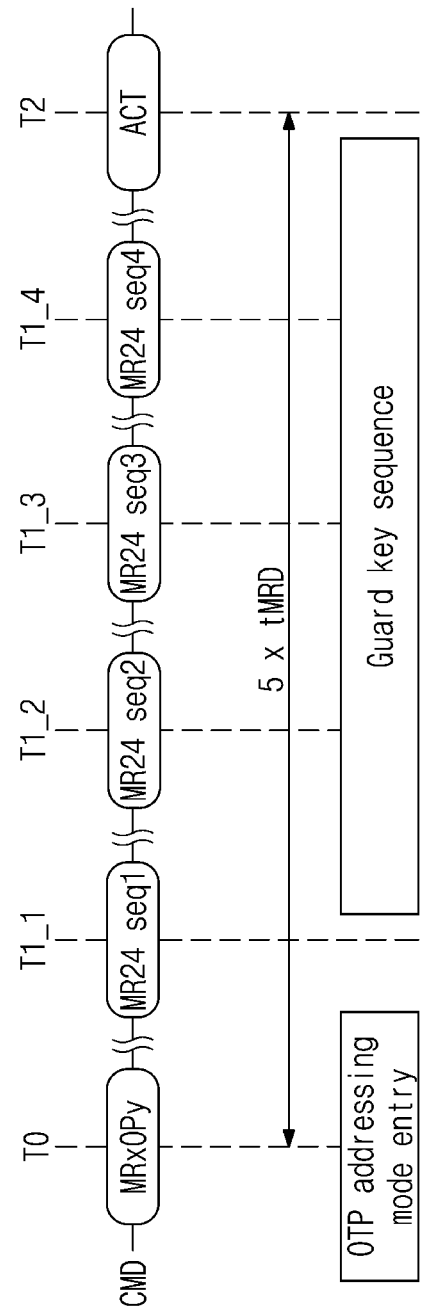
FIG. 9 is a timing diagram illustrating an example of a guard key sequence in OTP addressing mode.

FIGS. 7 to 10 are diagrams illustrating operations in an OTP addressing mode according to an example embodiment. For example, FIG. 7 is a timing diagram illustrating an example of an operation of a memory module in an OTP addressing mode. FIG. 8 is a diagram illustrating an example of a guard key sequence. FIG. 9 is a timing diagram illustrating an example of a guard key sequence in OTP addressing mode. FIG. 10 is a diagram illustrating an example of a unique ID of a target memory device. In FIG. 7, an example is provided where each of a plurality of memory devices enters or verify a guard key sequence.

Referring to FIG. 7, at time T0, an OTP command OTP CMD may be input. Accordingly, the memory module may enter or initiate the OTP addressing mode based on the OTP command OTP_CMD (see, for example, operation S10 of FIG. 2 and operation S10_1 of FIG. 4).

For example, the OTP command OTP_CMD may be defined as a combination of a mode register command MRx and an operand OPy. However, this is only an example, and the OTP command OTP_CMD may be defined in various manner such as a combination of a mode register command MR and an address, a combination of continuous mode register commands, or a new command.

At time T1, a time point at which time tMRD has passed from the time point T0, a plurality of mode register write commands MRWs may be sequentially input. Accordingly, the memory module may enter or verify the guard key sequence (see, for example, operations S20 of FIGS. 2 and 4).

When the plurality of sequentially input mode register write commands MRWs satisfy the guard key sequence, the memory module may perform a subsequent OTP addressing operation (see, for example, operations S30 in FIGS. 2 and 4). When the plurality of mode register write commands MRWs do not satisfy the guard key sequence, the memory module may exit the OTP addressing mode without performing the OTP addressing operation (see, for example, operations S40 in FIGS. 2 and 4). For example, the OTP addressing operation of permanently storing a unique ID in an ID storage region of a target memory device may be protected by using the guard key sequence.

Hereinafter, a more detailed description will be provided with reference to FIGS. 8 and 9. The guard key sequence may include a plurality of mode register commands MRs defined by a predetermined specific order and setting values.

For ease of description, an example is provided where the guard key sequence includes four guard keys. In this case, a first guard key may correspond to a command MR24 seq1, a second guard key may correspond to a command MR24 seq2, a third guard key may correspond to a command MR24 seq3, and a fourth guard key may correspond to a command MR24 seq4, as illustrated in FIG. 8.

The guard key sequence may be defined according to a predetermined order. For example, the guard key sequence may have a sequential order from the command 'MR24 seq1' to the command 'MR24 seq2', the command 'MR24 seq3', and the command 'MR24 seq4.'

The guard key sequence may be defined by predetermined setting values. For example, each of the command MR24 seq1 to the command MR24 seq4 may have a predetermined setting value, as illustrated in FIG. 8. For example, the command MR24 seq1 may have an OP[7:0] value of '11001111,' the command MR24 seq2 may have an OP[7:0] value of '01110011,' the command MR24 seq3 may have an OP[7:0] value of '10111011,' and the command MR24 seq4 may have an OP[7:0] value of '00111011.' However, this is only an example, and the setting value of each guard key may be changed in various ways.

In an example embodiment, a subsequent OTP addressing operation may be performed only when a plurality of mode register write commands MRWs, input to the memory module, satisfy the guard key sequence.

For example, only when the same mode register write command MRW as the command MR24 seq1 is input at time T1_1, the same mode register write command MRW as the command MR24 seq2 is input at time T1_2, and the same mode register write command MRW as the command MR24 seq3 is input at time T1_3, and the same mode register write command MRW as the command MR24 seq4 is input at time T1_4, it may be determined that the guard key sequence is satisfied, as illustrated in FIG. 9.

When the order of input mode register write commands MRWs is changed, the memory module may determine that the guard key sequence is not satisfied. In addition, when a non-mode register command such as another mode register write command, another mode register read command, or an active command ACT is input during the guard key sequence, the memory module may determine that the guard key sequence is not satisfied. In this case, the OTP addressing mode may be exited (see, for example, operations S40 of FIGS. 2 and 4) and the OTP addressing operation of programming a unique ID of a memory device in an ID storage region may not be performed.

Continuing to refer to FIG. 7, the active command ACT may be input at time T2 after the guard key sequence is satisfied. In this case, a unique ID of a target memory device may also be input (see, for example, operations S31a of FIG. 3A and operations S31b of FIG. 3B).

In an example embodiment, the unique ID of the target memory device may be provided using a column address CA. For example, the column address CA may be used to provide information on the unique ID of the target memory device, rather than to indicate location information.

For example, the unique ID of the target memory device may be provided using CA0 to CA7, as illustrated in FIG. 10. For example, in a state in which a chip select signal CS_n is high (H), CA0 may represent a zeroth bit value of the unique ID (for example, ID0) and CA1 may represent a first bit value of the unique ID (for example, ID1). Similarly, in a state in which the chip select signal CS_n is high (H), CA2 to CA7 may represent a second bit value (for example, ID2) to a seventh bit value (for example, ID7) of the unique ID, respectively.

However, this is only an example, and the unique ID of the target memory device may be provided in various ways according to example embodiments. For example, in a state in which the chip select signal is low (L), CA2 to CA10 may be used to indicate bit values of the unique ID of the target memory device. In addition, according to example embodiments, the unique ID of the target memory device may be provided using a row address, a bank address, a bank group address, or the like.

Continuing to refer to FIG. 7, a write command WRA may be input (see, for example, operation S32b of FIG. 3B) at time T3 at which RAS to CAS delay time (tRCD) has passed from the time point T2.

In this case, in some embodiments, an address such as a bank address may be input. The memory device may not care for an address input along with the write command WRA. For example, the memory device may treat the address input along with the write command WRA as a "don't care" address.

At time T4 at which a predetermined time has passed from the time point T3, among a plurality of memory devices included in a memory module, a target memory device may be selected based on a logic state of a data signal DQ (see, for example, operation S32a of FIG. 3A and operation S33b of FIG. 3B). The target memory device may refer to a memory device corresponding to a unique ID transmitted at time T2.

For example, in an example embodiment, when the data signal DQ provided to a memory device is low, it may mean that the memory device is a target memory device. When the data signal DQ provided to a memory device is high, it may mean that the memory device is not a target memory device.

According to an example embodiment, when DQ[3:0] is low, a memory device corresponding to the data signal DQ may be selected as a target memory device. In addition, according to an example embodiment, when DQ[3:0] is low for a predetermined time (for example, 8tCK), a memory device corresponding to the data signal DQ may be selected as a target memory device.

A time interval between the time points T3 and T4 may indicate write latency WL. The write latency WL may include CAS write latency CWL, additive latency AL, or the like.

When the memory device is identified as the target memory device at time T4, the memory module may program the unique ID, input along with an active command ACT, in an ID storage region of the target memory device (see, for example, operation S33a of FIG. 3A and operation S34b of FIG. 3B). As described above, the ID storage region may be implemented as an OTP memory such as an antifuse. A tPGM(MIN) time refers to a minimum time required to program the unique ID of the target memory device in the ID storage region.

At time T5 after the operation of programming the unique ID in the ID storage region is completed, a precharge command PRE may be input. Thus, the active state of the memory module may be released.

At time T6, a mode register write command MRW may be input. Thus, the OTP addressing mode may be exited (see, for example, operations S40 of FIGS. 2 and 4). A time interval tPGM Exit (MIN) between the time points T5 and T6 may refer to a minimum time required to exit the OTP addressing mode.

According to an example embodiment, an OTP addressing recognition operation may be performed between the time points T5 and T6 (see, for example, operation S35b of FIG. 3B). The OTP addressing recognition operation may refer to an operation in which the memory controller checks the unique ID programmed in the ID storage region of the target memory device. For example, the OTP addressing recognition operation may be performed through a loopback operation to be described below. However, according to example embodiments, the OTP addressing recognizing operation may be omitted, or OTP addressing recognizing operations may be performed on a plurality of memory devices at a time.

As discussed in FIGS. 7 to 10, the memory module may permanently and safely store a unique ID in an ID storage region of a target memory device through an OTP addressing mode according to example embodiments.

Figure 11:
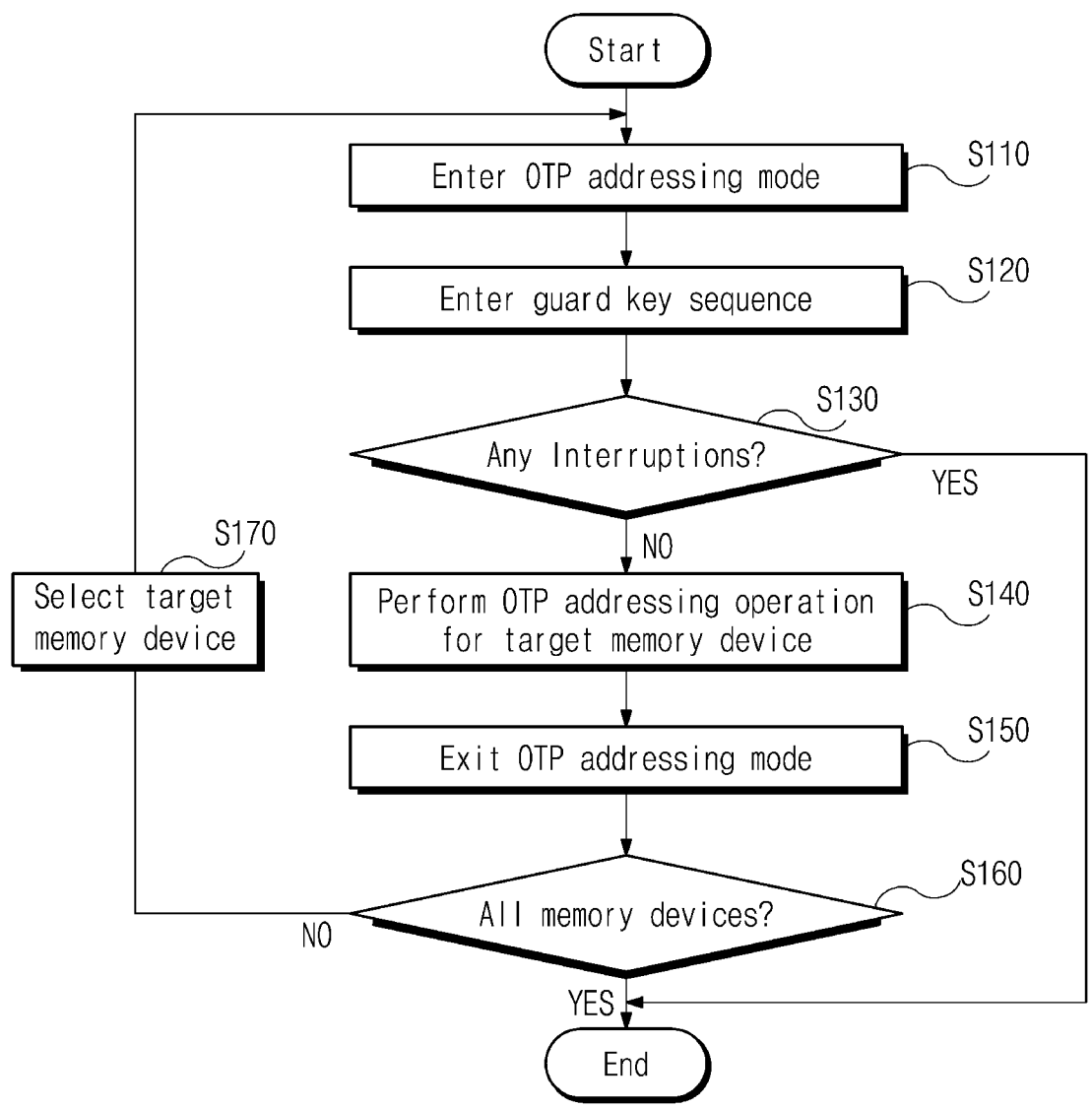
FIG. 11 is a flowchart illustrating an operation in an OTP addressing mode according to an example embodiment.

FIG. 11 is a flowchart illustrating an operation in an OTP addressing mode according to an example embodiment.

In operation S110, a memory module may enter or initiate an OTP addressing mode (see, for example, operation S10 of FIG. 2 and operation S10_1 of FIG. 4).

For example, the memory module may receive an OTP command to enter or initiate the OTP addressing mode.

In operation S120, the memory module may enter or verify a guard key sequence (see, for example, operations S20 of FIGS. 2 and 4).

For example, the memory module may determine whether a mode register command, received from a memory controller, matches a guard key sequence of a predetermined order and/or a setting value.

In operation S130, the memory module may determine whether an interruption, which does not satisfy the guard key sequence, has occurred.

For example, when the order and/or setting values of continuous mode register commands received from the memory controller do not match the guard key sequence or when another command is received midway, the memory module may determine that an interruption has occurred.

When an interruption has occurred, a subsequent OTP addressing operation may not be performed and the OTP addressing mode may be exited. When no interruption has occurred, the flow proceeds to operation S140.

In operation S140, the memory module may perform an OTP addressing operation on a target memory device (see, for example, operations S30 in FIGS. 2 and 4).

For example, the memory module may receive a unique ID corresponding to the target memory device, together with the active command ACT, from the memory controller. Then, the memory controller may provide a data signal DQ having a low level to the target memory device, among a plurality of memory devices included in the memory module, and may provide a data signal DQ having a high level to memory devices other than the target memory device. Accordingly, the memory module may identify the target memory device based on the data signal DQ, and may program the unique ID received together with the active command ACT in an ID storage region of the target memory device.

In operation S150, the memory module may exit the OTP addressing mode. (see, for example, operations S40 in FIGS. 2 and 4).

In operation S160, the memory module may determine whether an OTP addressing operation has been performed on all memory devices included in the memory module.

When the OTP addressing operation has not been performed on all memory devices, the flow proceeds to operation S170 in which another memory device may be selected as a target memory device. Then, the OTP addressing mode may be repeatedly performed on the selected target memory device.

Through the above-described OTP address mode according to an example embodiment, a unique ID of each of the plurality of memory devices included in the memory module may be permanently and safely stored in the ID storage region of the corresponding memory device. In addition, an independent guard key sequence may be entered or configured for each memory device, so that a unique ID may be more safely programmed in the ID storage region.

Figure 12:
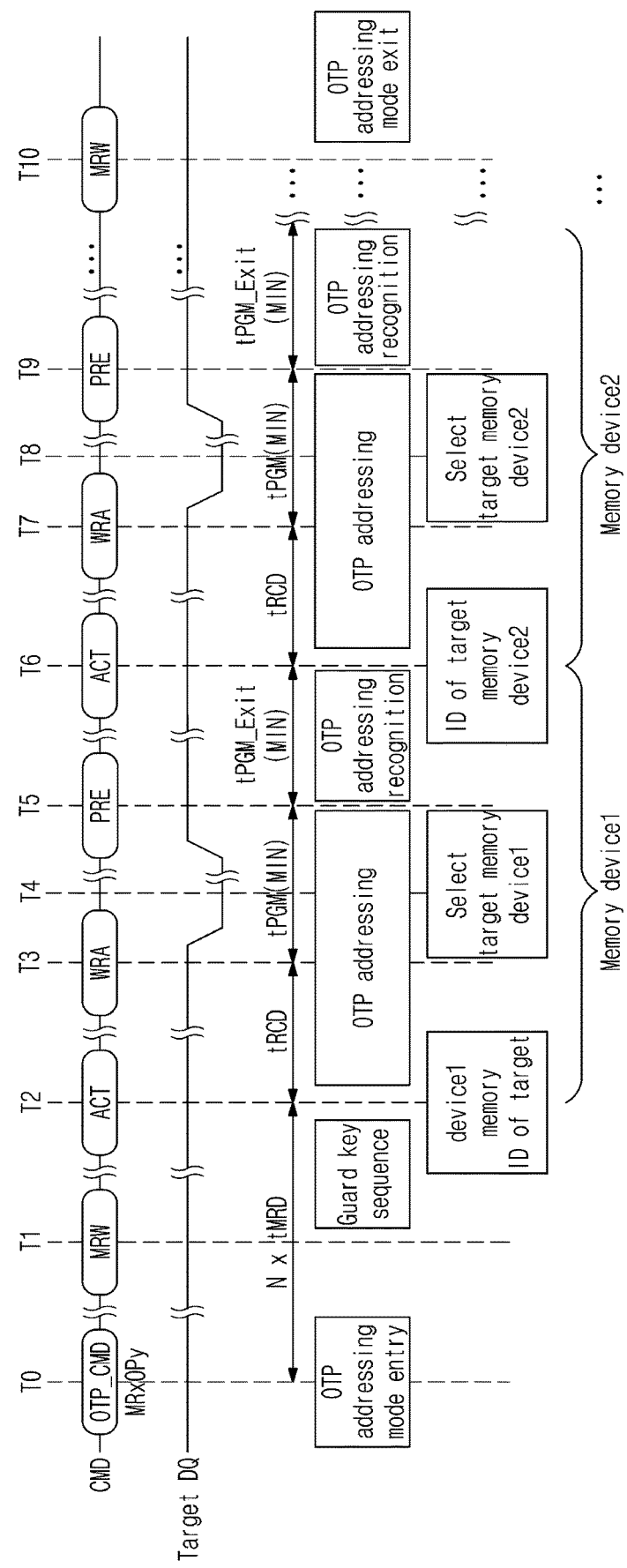
FIG. 12 is a timing diagram illustrating an operation in an OTP addressing mode according to an example embodiment.
Figure 13:
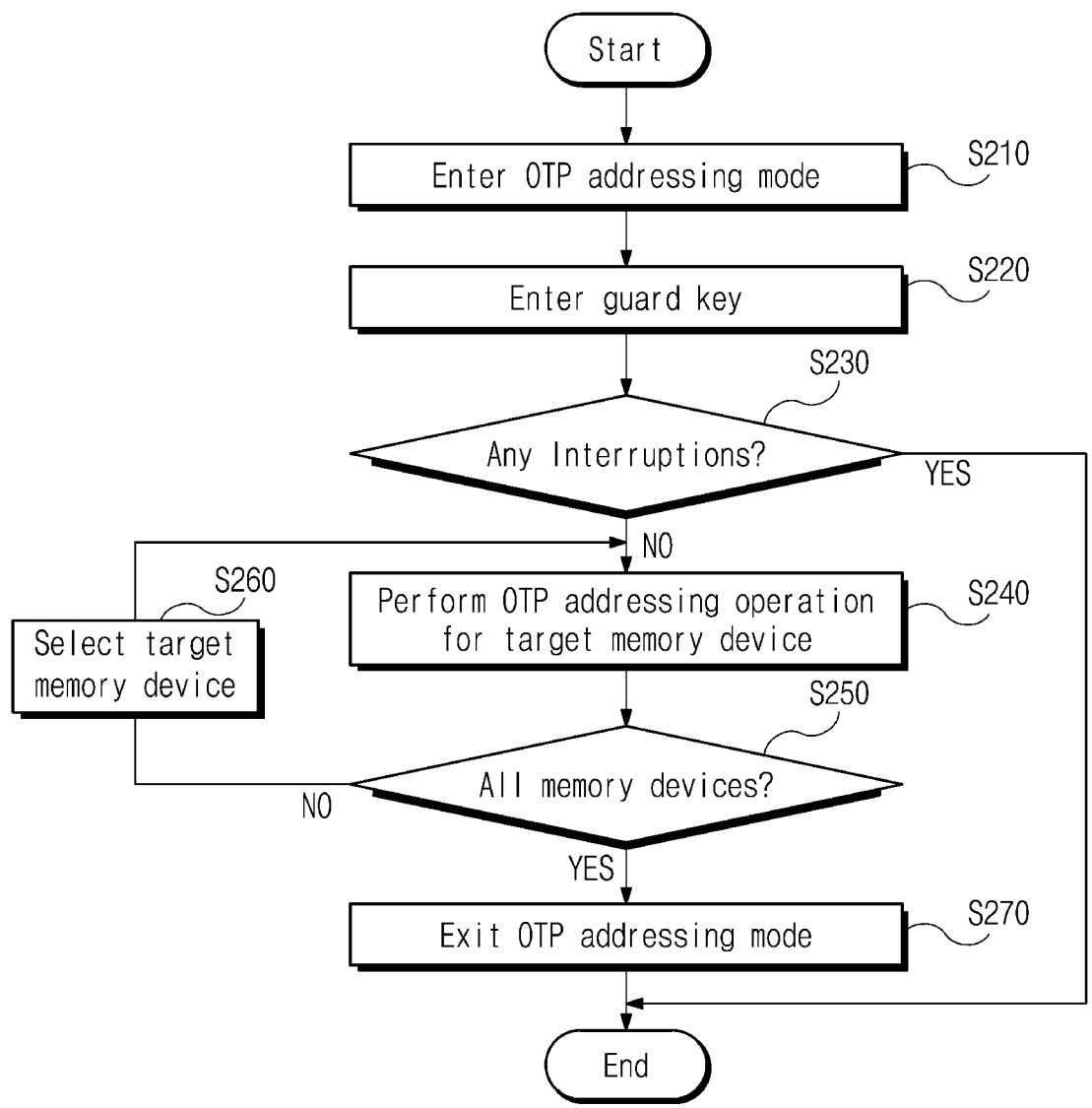
FIG. 13 is a flowchart illustrating an operation in OTP addressing mode according to an example embodiment.

FIG. 12 is a timing diagram illustrating an operation in an OTP addressing mode according to an example embodiment, and FIG. 13 is a flowchart illustrating an operation in an OTP addressing mode according to an example embodiment. The OTP addressing mode of FIG. 12 may be similar to the OTP addressing mode of FIGS. 7 to 10. Accordingly, the same or similar components will be denoted by the same or similar reference numerals, and redundant descriptions will be omitted below. For ease of description, an example will be provided where a first memory device and a second memory device are sequentially selected as a target memory device. According to an example embodiment, the timing diagram of FIG. 12 may correspond to the operation in the OTP addressing mode illustrated in the flowchart of FIG. 13.

Referring to FIG. 12, after satisfying a single guard key sequence, OTP addressing operations may be continuously performed on a plurality of memory devices. For example, the OTP addressing operations performed on the plurality of memory devices may be protected by using the same guard key sequence.

At time T0, an OTP command OTP_CMD may be input. Accordingly, the memory module may enter or initiate an OTP addressing mode based on the OTP command OTP_CMD (see, for example, operation S210 of FIG. 13).

At time T1, a plurality of mode register write commands MRWs may be sequentially input (see, for example, operation S220 of FIG. 13). When the plurality of mode register write commands MRWs sequentially input satisfy a guard key sequence (see, for example, operation S230 of FIG. 13), the memory module may perform a subsequent OTP addressing operation (see, for example, S240 of FIG. 13).

At time T2, an active command ACT may be input, along with a unique ID corresponding to the first memory device, which is a target memory device.

At time T3, a write command WRA may be input.

At time T4, the memory module may select a first memory device, among a plurality of memory devices, as a target memory device based on the logic state of the data signal DQ. For example, among the plurality of memory devices, the first memory device to which a data signal DQ having a low level is provided may be selected as a target memory device.

At time T4, the memory module may program the unique ID, which is input together with the active command ACT, in an ID storage region of the first memory device.

At time T5, a precharge command PRE may be input. Accordingly, an active state of the memory module may be released.

At time T6, the active command ACT may be input, along with a unique ID corresponding to a second memory device, which is a new target memory device.

At time T7, a write command WRA may be input.

At time T8, the memory module may select the second memory device, among the plurality of memory devices, as a target memory device based on a logic state of the data signal DQ (see, for example, operation S260 of FIG. 13). The memory module may program the unique ID, which is input along with the active command ACT at time T6, in the ID storage region of the second memory device.

At time T9, a precharge command PRE may be input. Accordingly, an active state of the memory module may be released.

In a similar manner, when the unique ID program on all memory devices is not completed (see, for example, operation S250 of FIG. 13), operations of programming unique IDs may be sequentially performed on remaining memory devices, among the plurality of memory devices included in the memory module. When the unique ID program on all memory devices is completed (see, for example, operation S250 of FIG. 13), the memory module may exit the OTP addressing mode (see, for example, operation S270 of FIG. 13).

As described above, in the OTP addressing mode according to an example embodiment, an OTP addressing operations may be continuously performed on a plurality of memory devices after satisfying a guard key sequence once. For example, when the OTP addressing operations are performed on the plurality of memory devices, only one guard key sequence may be required. Accordingly, time required to perform the OTP addressing mode may be reduced.

As described above, FIG. 13 illustrates an operation in OTP addressing mode according to an example embodiment. According to an example embodiment, the flowchart of FIG. 13 may correspond to the operation in the OTP addressing mode illustrated in the timing diagram of FIG. 12. The operation in the OTP addressing mode of FIG. 13 may be similar to that of FIG. 11. Therefore, redundant descriptions will be omitted below.

Referring to FIG. 13, in operation S210, a memory module may enter or initiate an OTP addressing mode (see, for example, operations S10 in FIGS. 2 and S10_1 in FIG. 4).

In operation S220, the memory module may enter a guard key sequence to check or verify a guard key sequence (for example, see operations S20 of FIGS. 2 and 4).

In operation S230, the memory module may determine whether an interruption, which does not satisfy the guard key sequence, has occurred. When an interruption has occurred, a subsequent OTP addressing operation may not be performed and the memory module may exit the OTP addressing mode. When no interruption has occurred, the flow proceeds to operation S240.

In operation S240, the memory module may perform an OTP addressing operation on a target memory device (see, for example, operations S30 of FIGS. 2 and 4).

In operation S250, a determination may be made as to whether an OTP addressing operation has been performed on all memory devices in the memory module.

When the OTP addressing operation has not been performed on all memory devices, the flow proceeds to operation S260 in which another memory device may be selected as a target memory device. Then, an OTP addressing operation may be performed on the selected target memory device. When the OTP addressing operation is performed on all memory devices, the flow proceeds to operation S270 in which the memory module may exit the OTP addressing mode (see, for example, operations S40 in FIGS. 2 and 4).

Through the above-described OTP addressing mode according to an example embodiment, a unique ID of each memory device included in a memory module may be permanently and safely stored in an ID storage region of a corresponding memory device. In addition, a guard key sequence may be input only once, so that time required to exit the OTP addressing mode may be reduced.

Figure 14:
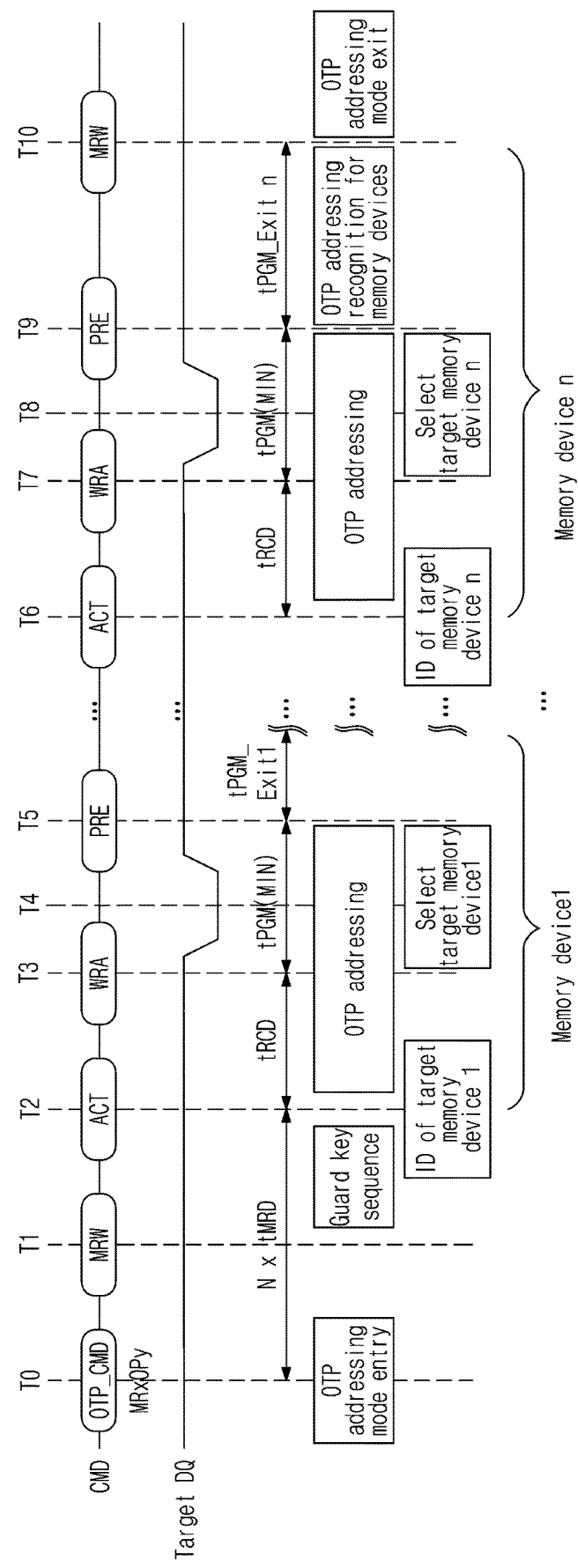
FIG. 14 is a timing diagram illustrating an operation in an OTP addressing mode according to an example embodiment.
Figure 15:
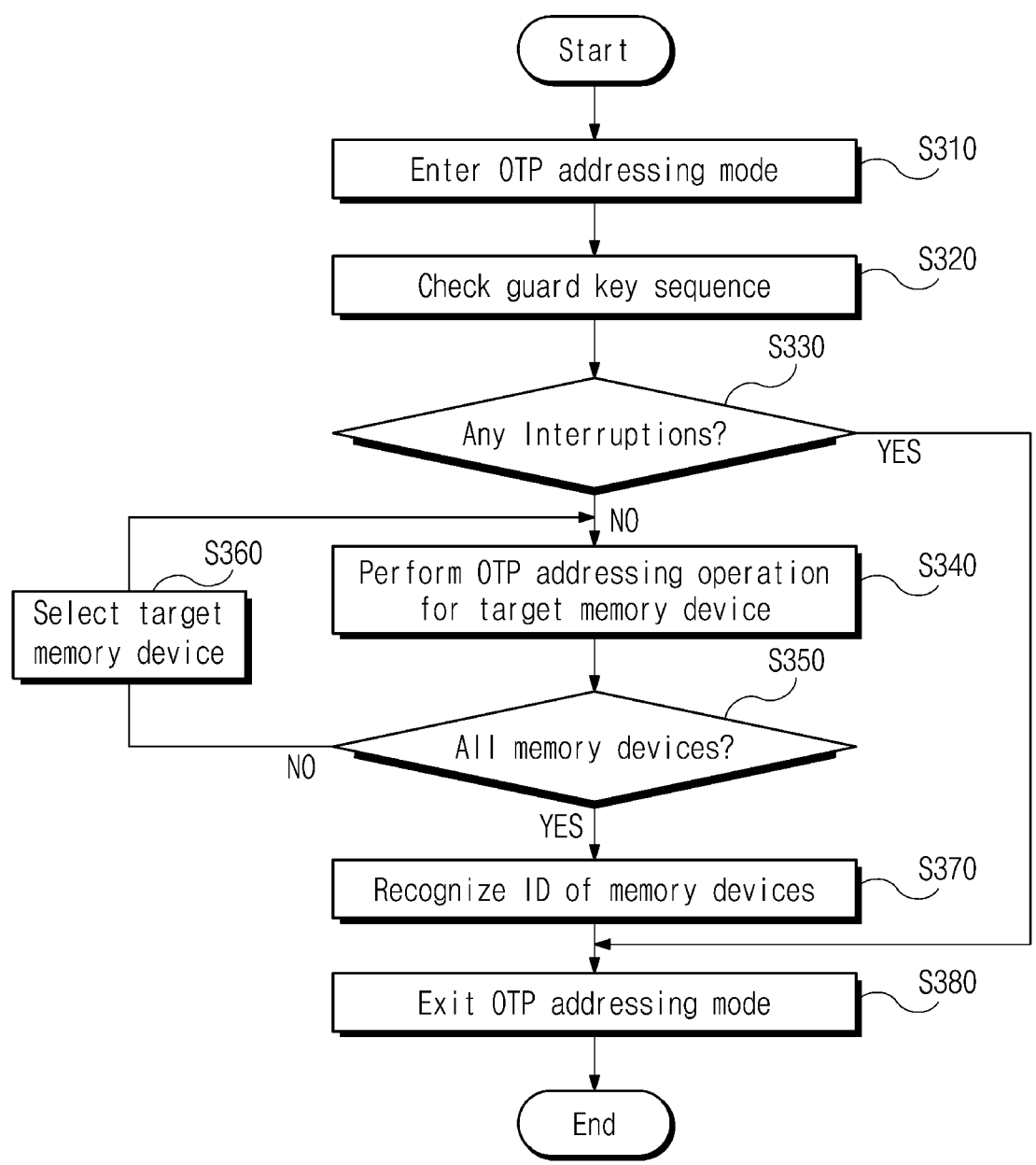
FIG. 15 is a flowchart illustrating an operation in OTP addressing mode according to an example embodiment.

FIG. 14 is a timing diagram illustrating an operation in an OTP addressing mode according to an example embodiment, and FIG. 15 is a flowchart illustrating an operation in OTP addressing mode according to an example embodiment. The OTP addressing mode of FIG. 14 may be similar to the OTP addressing mode of FIG. 12. Accordingly, the same or similar components will be denoted by the same or similar reference numerals, and redundant descriptions will be omitted below. According to an example embodiment, the timing diagram of FIG. 14 may correspond to the operation in the OTP addressing mode illustrated in the flowchart of FIG. 15. For ease of description, similarly to FIG. 12, an example will be provided where OTP addressing operations on a plurality of memory devices are continuously performed after satisfying a single guard key sequence. In addition, an example will be provided where first to n-th memory devices are sequentially selected as a target memory device.

Referring to FIG. 14, at time T0, an OTP command OTP_CMD may be input. Accordingly, a memory module may enter or initiate an OTP addressing mode based on the OTP command OTP_CMD (see, for example, operation S310 of FIG. 15).

At time T1, a plurality of mode register write commands MRWs may be sequentially input (see, for example, operation S320 of FIG. 15). When the plurality of mode register write commands MRWs sequentially input satisfy the guard key sequence (see, for example, operation S330 of FIG. 15), the memory module may perform a subsequent OTP addressing operation (see, for example, operation S340 of FIG. 15).

At time T2, an active command ACT may be input, along with a unique ID corresponding to a first memory device, which is a target memory device.

At time T3, a write command WRA may be input.

At time T4, among a plurality of memory devices included in the memory module, a first memory device may be selected as a target memory device based on a logic state of a data signal DQ (see, for example, operation S260 of FIG. 13). The memory module may program the unique ID, which is input together with the active command ACT, in an ID storage region of the first memory device.

At time T5, a precharge command PRE may be input. Accordingly, an active state of the memory module may be released. Unlike FIG. 12, the OTP addressing recognition operation on the first memory device, which is the target memory device, may be omitted. Since the OTP addressing recognition operation is not performed, time tPGM_Exit 1 of FIG. 14, which is required to exit the OTP addressing mode, may be reduced compared with the time tPGM_Exit of FIG. 12.

When the unique ID program on all memory devices is not completed (see, for example, operation S250 of FIG. 13), OTP addressing operations on second to n−1-th memory devices may be continuously performed. In this case, OTP recognition operations with respect to unique IDs respectively corresponding to the second to n−1-th memory devices may be omitted.

At time T6, the active command ACT may be input, along with a unique ID corresponding to the n-th memory device, which is a new target memory device.

At the time point T7, a write command WRA may be input.

At time T8, among the plurality of memory devices included in the memory module, the n-th memory device may be selected as a target memory device based on the logic state of the data signal DQ. The memory module may program the unique ID, which is input along with the active command ACT, into the ID storage region of the nth memory device.

At time T9, a precharge command PRE may be input. Accordingly, the active state of the memory module may be released.

In an example embodiment, an OTP addressing recognition operation may be performed on the first to n-th memory devices included in the memory module between times T9 and T10 (see, for example, operation S370 of FIG. 15). For example, OTP addressing recognition operations may be performed on the plurality of memory devices at a time between times T9 and T10. Accordingly, time required to perform the OTP addressing mode may be further reduced.

At time T10, a mode register write command MRW may be input. Accordingly, the OTP addressing mode may be exited (see, for example, operation S380 of FIG. 15).

As described above, FIG. 15 illustrates an operation in OTP addressing mode according to an example embodiment. The operation in the OTP addressing mode of FIG. 15 may be similar to that of FIG. 13. Therefore, redundant descriptions will be omitted below. According to an example embodiment, the flowchart of FIG. 15 may correspond to the operation in the OTP addressing mode illustrated in the timing diagram of FIG. 14.

Referring to FIG. 15, in operation S310, a memory module may enter or initiate an OTP addressing mode (see, for example, operation S10 of FIG. 2 and operation S10_1 of FIG. 4).

In operation S320, the memory module may enter and check or verify a guard key sequence (see, for example, operations S20 of FIGS. 2 and 4).

In operation S330, the memory module may determine whether an interruption, which does not satisfy the guard key sequence, has occurred. When the interruption has occurred, a subsequent OTP addressing operation may not be performed and the memory module may exit the OTP addressing mode. When no interruption has occurred, the flow proceeds to S340.

In operation S340, the memory module may perform an OTP addressing operation on a target memory device (see, for example, operations S30 of FIGS. 2 and 4).

In operation S350, a determination may be made as to whether the OTP addressing operation has been performed on all memory devices included in the memory module.

When the OTP addressing operation has not been performed on all memory devices, the flow proceeds to operation S360 in which another memory device may be selected as a target memory device. Then, an OTP addressing operation may be performed on the selected target memory device. When the OTP addressing operation has been performed on all memory devices, the flow proceeds to operation S370 in which OTP addressing recognition operations may be performed on a plurality of memory devices at a time.

In operation S380, the memory module may exit the OTP addressing mode (see, for example, operations S40 of FIGS. 2 and 4).

Through the above-described OTP addressing mode according to an example embodiment, a unique ID of each memory device included in the memory module may be permanently and safely stored in an ID storage region of a corresponding memory device. In addition, OTP addressing recognition operations may be performed on the plurality of memory devices at a time, so that time required to perform the OTP addressing mode may be further reduced.

Figure 16:
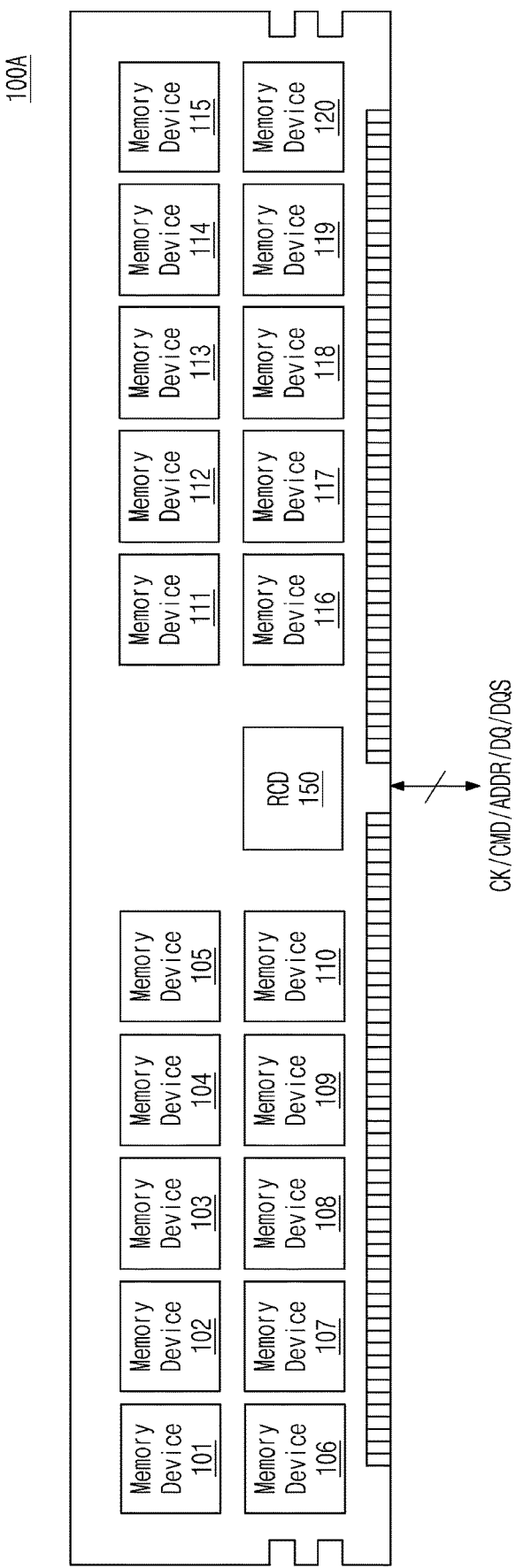
FIGS. 16 and 17 are diagrams illustrating a memory module according to example embodiments.
Figure 17:
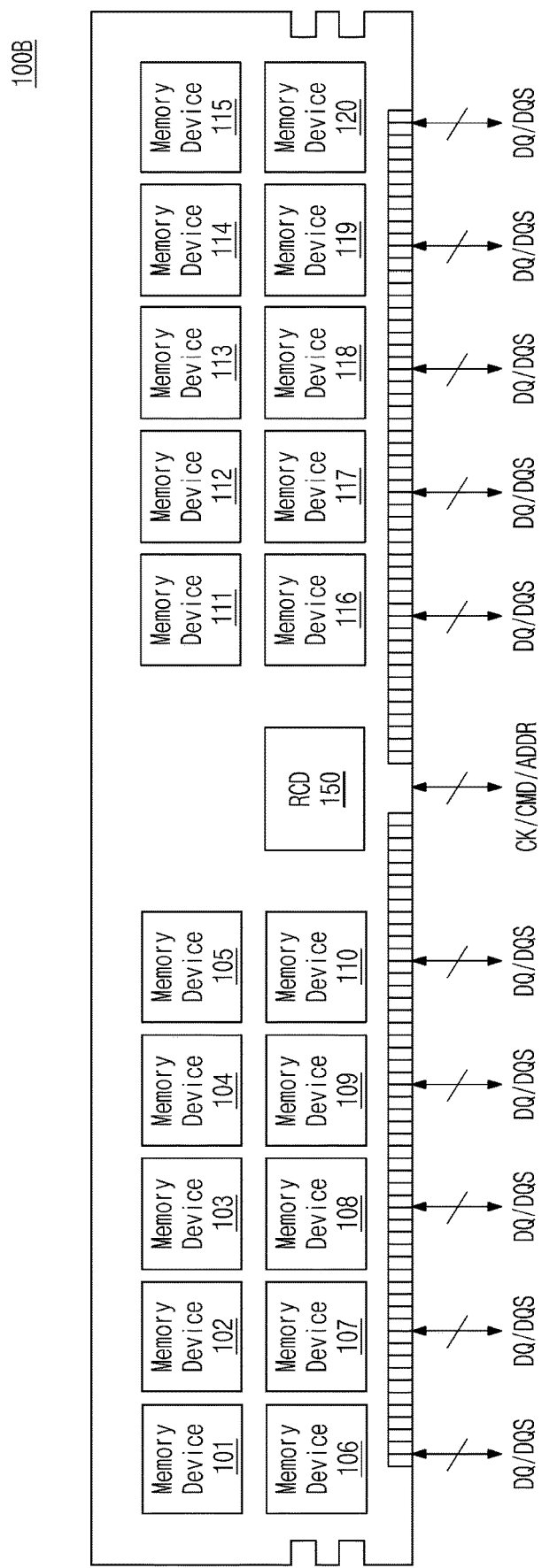

FIGS. 16 and 17 are diagrams illustrating a memory module according to example embodiments. Memory modules 100A and 100B of FIGS. 16 and 17 may each be one of the memory modules 100 of FIGS. 1A to 1C.

Referring to FIGS. 16 and 17, each of the memory modules 100A and 100B may include a plurality of memory devices 101 to 120 and a register clock driver (RCD) 150. The plurality of memory devices 101 to 120 may be positioned left and right with respect to the register clock driver 150.

Each of the memory modules 100A and 100B may be a DIMM that complies with the JEDEC standard. For example, the memory module 100A may be a registered DIMM (RDIMM), a load reduced DIMM (LRDIMM), an unbuffered DIMM (UDIMM), a fully buffered DIMM (FB-DIMM), a small outline DIMM (SO-DIMM), or another memory module (for example, a SIMM).

Each of the memory devices 101 to 120 may be the memory device of FIG. 5. The memory devices 101 to 120 may include any of various DRAM devices such as a DDR SDRAM, an LPDDR SDRAM, or a GDDR SGRAM. Alternatively, the memory devices 101 to 120 may include an SRAM, a NAND flash memory, a NOR flash memory, a RRAM, a FRAM, a PRAM, a TRAM, and/or an MRAM. The types of the memory devices 101 to 120 may be the same or different from each other.

The number of memory devices 101 to 120 included in the memory modules 100A and 100B is only an example, and may be determined depending on capacity of a memory provided to a user and capacity of each of the memory devices 101 to 120.

According to an example embodiment, the plurality of memory devices 101 to 120 may share a transmission path for a clock CK, a command CMD, an address signal ADDR, a data signal DQ, and a data strobe signal DQS, as illustrated in FIG. 16.

In this case, the register clock driver 150 may receive the clock CK, the command CMD, the address ADDR, the data signal DQ, and the data strobe signal DQS from the memory controller 200 (see FIG. 1). The register clock driver 150 may control the memory devices 101 to 120 based on the clock CK, the command CMD, the address ADDR, the data signal DQ, and the data strobe signal DQS. The register clock driver 150 may serve as a buffer for the clock CK, the command CMD, the address ADDR, the data signal DQ, and the data strobe signal DQS.

According to an example embodiment, the plurality of memory devices 101 to 120 may share transmission paths for a clock CK, a command CMD, and an address signal ADDR, but may not share a transmission path for a signal DQ and a data strobe signal DQS, as illustrated in FIG. 17. For example, each of the plurality of memory devices 101 to 120 may independently receive the data signal DQ and the data strobe signal DQS from the memory controller 200. Accordingly, the memory controller 200 may independently set operating modes of each of the plurality of memory devices 101 to 120.

In this case, the register clock driver 150 may receive the clock CK, the command CMD, and the address ADDR from the memory controller 200. The register clock driver 150 may serve as a buffer for the clock CK, the command CMD, and the address ADDR.

Figure 18:
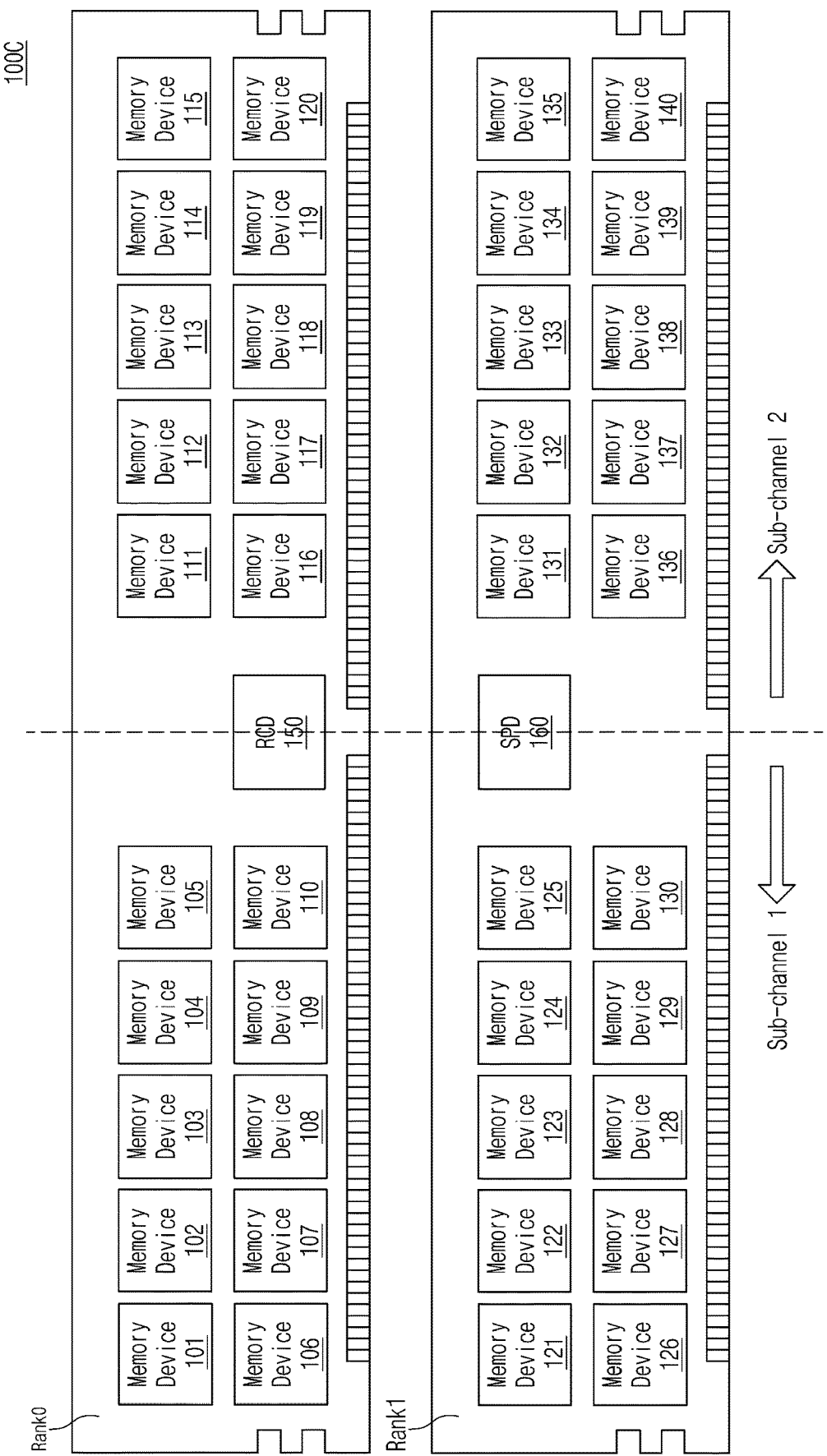
FIG. 18 is a diagram illustrating an example of a memory module according to an example embodiment.

According to an example embodiment, as illustrated in FIG. 18 to be described below, a memory module may communicate with a memory controller 200 through different sub-channels.

Figure 20:
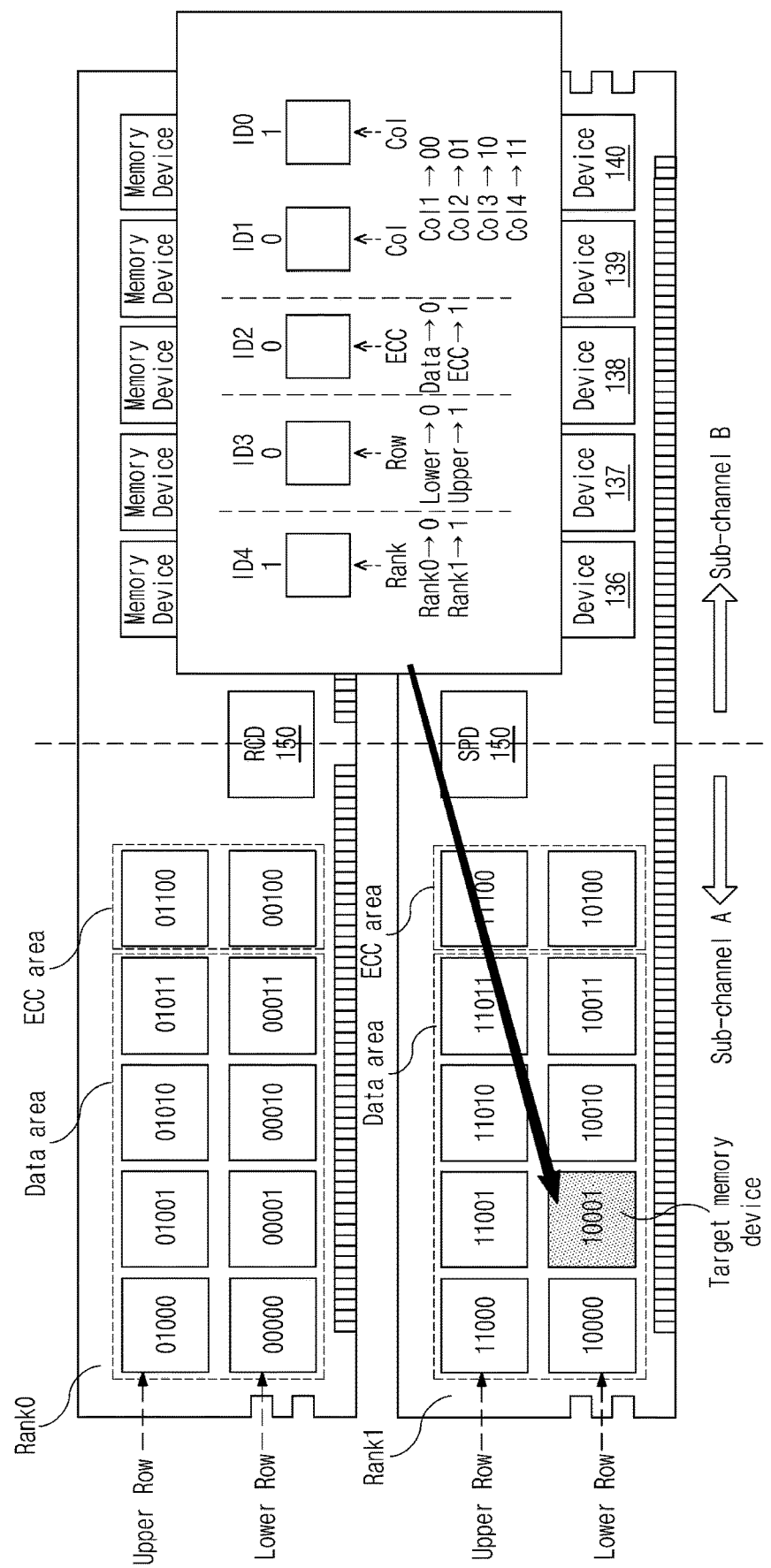
FIG. 20 is a diagram illustrating an example of assigning a unique ID of FIG. 19 to a target memory device.

FIGS. 18 to 20 are diagrams illustrating examples of assigning a unique ID to a memory device according to example embodiments. FIG. 18 is a diagram illustrating an example of a memory module 100C according to an example embodiment. FIG. 19 is a diagram illustrating an example in which information on a unique ID is transmitted using a column address according to an example embodiment. FIG. 20 is a diagram illustrating an example in which the unique ID of FIG. 19 is assigned to a target memory device.

Hereinafter, an example will be provided where a memory module communicates with a memory controller through two different sub-channels. In addition, an example will be provided where a memory device 127 is a target memory device and a unique ID thereof is '10001.'

Referring to FIG. 18, the memory module 100C may include a plurality of memory devices 101 to 120 and a plurality of memory devices 121 to 140 that are disposed on opposite surfaces of the memory module 100C. In addition, the plurality of memory devices 101 to 120 disposed on a first surface of the memory module 100C may be positioned left and right with respect to the register clock driver 150. The plurality of memory devices 121 to 140 disposed on a second surface of the memory module 100C may be positioned left and right with respect to a serial presence detection (SPD) 160.

The memory devices 101 to 110 and the memory devices 121 to 130, disposed on a left side of the memory module 100C, may communicate with the memory controller 200 (see FIG. 1) through a first sub-channel Sub_Channel 1. The memory devices 111 to 120 and the memory devices 131 to 140, disposed on a right side of the memory module 100C, may communicate with the memory controller 200 (see FIG. 1) through a second sub-channel Sub_Channel 2.

Referring to FIG. 19, information on a unique ID of a target memory device may be indicated using a column address CA. For example, the unique ID of the target memory device may be defined by values of zeroth to fourth column addresses CA0 to CA4 when a chip select signal CS_n is high. For example, the values of the zeroth to fourth column addresses CA0 to CA4 may correspond to zeroth to fourth bit values ID0 to ID4 of the unique ID, respectively. For example, the unique ID of the target memory device may be '10001,' as illustrated in FIG. 19.

Referring to FIG. 20, the fourth bit value ID4 of the unique ID may correspond to rank information. For example, when the fourth bit value ID4 of the unique ID is '0,' the target memory device may be disposed in a zeroth rank Rank0. When the fourth bit value ID4 of the unique ID is '1,' the target memory device may be disposed in a first rank Rank1.

The third bit value ID3 of the unique ID may correspond to row information. For example, when the third bit value ID3 of the unique ID is '0,' the target memory device may be disposed in a lower row. When the third bit value ID3 of the unique ID is '1,' the target memory device may be disposed in an upper row.

The second bit value ID2 of the unique ID may correspond to error correction code (ECC) area information. For example, when the second bit value ID2 of the unique ID is '0', the target memory device may be disposed in the data area. When the second bit value ID2 of the unique ID is '1', the target memory device may be disposed in an ECC area.

The first and the zeroth bit values ID1 and ID0 of the unique ID may correspond to information of column Col. For example, when the first and the zeroth bit values ID1 and ID0 of the unique ID are '00,' the target memory device may be disposed in a first column Col1 on the left side of the memory module 100C. When the first and the zeroth bit values ID1 and ID0 of the unique ID are '01,' the target memory device may be disposed in a second column Col2 on the left side of the memory module 100C. When the first and the zeroth bit values ID1 and ID0 of the unique ID are '10,' the target memory device may be disposed in a third column Col3 on the left side of the memory module 100C. When the first and the zeroth bit values ID1 and ID0 of the unique ID are '11,' the target memory device may be disposed in a fourth column Col4 on the left side of the memory module 100C.

In such a manner, for example, the unique ID of the memory device 127 in FIG. 18 may be given as '10001.' When the memory device 127 of FIG. 18 is set as a target memory device, the unique ID of '10001' may be stored in an ID storage region of the memory device 127 through the above-described OTP addressing mode.

Figure 21:
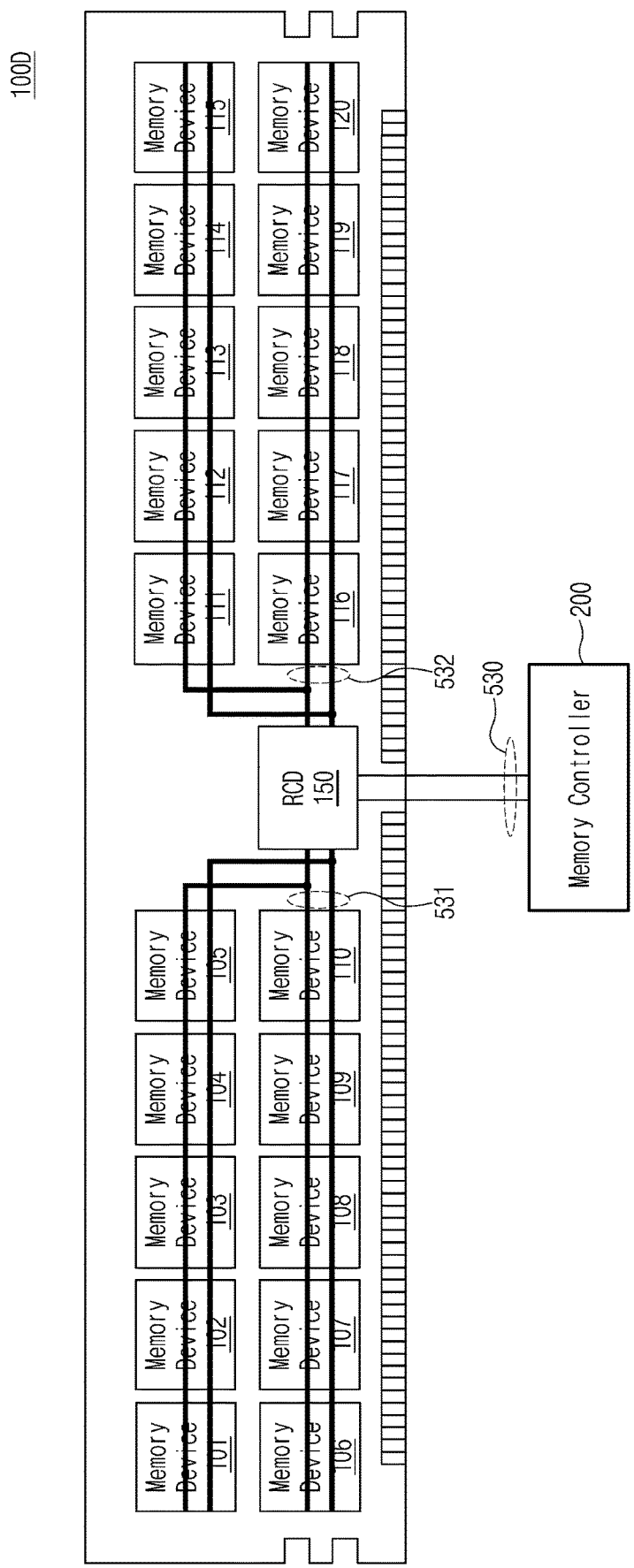
FIG. 21 is a schematic diagram illustrating an example of an OTP addressing recognition operation according to an example embodiment.

FIG. 21 is a schematic diagram illustrating an example of an OTP addressing recognition operation according to an example embodiment. An example, in which an OTP addressing recognition operation is performed through a loopback operation, is illustrated in FIG. 21.

Referring to FIG. 21, a memory module 100D may support a loopback operation in which a signal or data received from a memory controller 200 are fed back to the memory controller 200. The loopback operation may be an operation of immediately reading back data sent to each of the memory devices 101 to 120. In this case, the memory controller 200 may immediately read back data sent to each of the memory devices 101 to 120 without issuing a write command or a read command.

In an example embodiment, the OTP addressing recognition operation may be performed through a loopback operation. For example, a unique ID stored in a target memory device of the memory module 100D may be immediately read back to the memory controller 200 through a loopback operation. Accordingly, the unique ID stored in the target memory device may be rapidly identified.

In this case, the unique ID stored in each of the memory devices 101 to 120 may be transmitted to the memory controller 200 through a loopback path. The loopback path may refer to a path including a sideband bus 530. The sideband bus 530 may correspond to a memory module management communication bus associated with management of a memory module or a memory device. As an example, the sideband bus 530 may correspond to the second bus 520 of FIGS. 1B and 1C.

In an example embodiment, the memory devices 101 to 110 disposed on the left side of the memory module 100D may be connected to a register clock driver 150 through a first loopback bus 531. The memory devices 111 to 120 disposed on the right side of the memory module 100D may be connected to the register clock driver 150 through a second loopback bus 532. The register clock driver 150 may be connected to the memory controller 200 through the sideband bus 530.

When a unique ID is stored in the target memory device, a unique ID stored in an ID storage region of the target memory device may be read back to the memory controller 200 via the first loopback bus 531 or the second loopback bus 532 and the sideband bus 530. In this case, the first and the second loopback buses 531 and 532 and the sideband bus 530 may be sideband buses that are not used for a write operation or a read operation.

Figure 22:
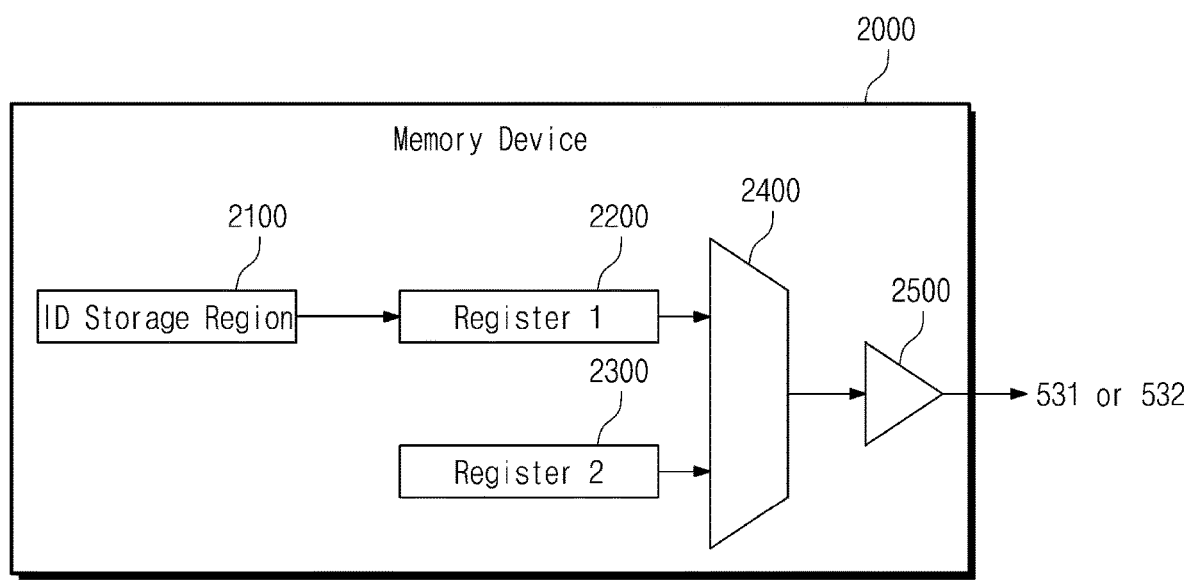
FIG. 22 is a schematic diagram illustrating an example of a memory device according to an example embodiment.

FIG. 22 is a schematic diagram illustrating an example of a memory device according to an example embodiment. A memory device 2000 of FIG. 22 may be one of the memory devices of FIG. 21.

Referring to FIG. 22, the memory device 2000 may perform an OTP addressing recognition operation according to an example embodiment through a loopback operation. To this end, the memory device 2000 may include an ID storage region 2100, a first register 2200, a second register 2300, a multiplexer 2400, and a driver 2500.

The ID storage region 2100 may store a unique ID of the memory device 2000, and may correspond to the ID storage region 1230 of FIG. 5. The first register 2200 may store the unique ID received from the ID storage region 2100. The second register 2300 may store loopback data LBDQ used for a general loopback operation. The loopback data LBDQ may include, for example, temperature information and telemetry information of the memory device 2000.

During the OTP addressing recognition operation, the multiplexer 2400 may select a unique ID stored in the first register 2200 and transmit the selected unique ID to the driver 2500. The driver 2500 may transmit the received unique ID to the first loopback bus 531 or the second loopback bus 532. Accordingly, the memory controller 200 may immediately check the unique ID stored in the target memory device through a loopback operation.

As set forth above, according to example embodiments, a storage device for permanently and safely storing a unique ID of each of a plurality of memory devices included in a memory module is provided.

At least one of the components, elements, modules, units, or the like (collectively "components" in this paragraph) represented by a block or an equivalent indication (collectively "block") in the above embodiments, for example, device, logic, controller, circuit, generator, detector, encoder, decoder, operator, latch, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). These components may, for example, be embodied in one or more semiconductor chips, or on substrate supports such as printed circuit boards and the like. These circuits may also be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

While example embodiments have been shown and described above, it will be apparent to those skilled in the art that modifications and variations may be made without departing from the scope of the inventive concept as defined by the appended claims and their equivalents.

What is claimed is:

1. A method of operating a memory module that communicates with a memory controller, the method comprising:
   entering a one-time programmable (OTP) addressing mode based on an OTP command received from the memory controller;
   determining whether a guard key sequence is satisfied based on a plurality of mode register commands received from the memory controller;
   entering an active state in response to an active command, and programming, based on a determination that the guard key sequence is satisfied, a unique identifier (ID), corresponding to a target memory device, into the target memory device, among a plurality of memory devices included in the memory module; and
   in response to receiving a precharge command from the memory controller after the programming the unique ID into the target memory device is completed, releasing the active state.

2. The method of claim 1, wherein the programming the unique ID into the target memory device comprises:
   receiving the unique ID of the target memory device together with a command from the memory controller;
   selecting the target memory device, among the plurality of memory devices, based on a data signal received from the memory controller; and
   programming the unique ID into an ID storage region of the target memory device.

3. The method of claim 1, wherein the programming the unique ID into the target memory device comprises:
   receiving the unique ID of the target memory device, together with an active command, from the memory controller;
   receiving a write command from the memory controller;
   selecting the target memory device from among the plurality of memory devices based on a data signal received from the memory controller; and
   programming the unique ID into an ID storage region of the target memory device.

4. The method of claim 1, wherein the unique ID of the target memory device is provided to the memory module from the memory controller by using a plurality of column addresses.

5. The method of claim 4, further comprising:
transmitting the unique ID, programmed into an ID storage region of the target memory device, to the memory controller.

6. The method of claim 5, wherein the memory controller and the memory module are configured to communicate with each other through a plurality of different buses, and
wherein the unique ID, programmed into the ID storage region of the target memory device, is transmitted to the memory controller through a sideband bus.

7. The method of claim 1, wherein the determining whether the guard key sequence is satisfied comprises:
continuously receiving the plurality of mode register commands from the memory controller; and
determining whether an order and values of the plurality of mode register commands are the same as a predetermined order and predetermined values of the guard key sequence.

8. The method of claim 1, further comprising:
exiting the OTP addressing mode after the programming the unique ID into the target memory device is completed;
determining whether a memory device for which a unique ID has not been programmed is present, among the plurality of memory devices; and
entering the OTP addressing mode with respect to the memory device, for which a unique ID has not been programmed, as a next target memory device.

9. The method of claim 1, further comprising:
determining, as a next target memory device, a memory device for which a unique ID has not been programmed, among the plurality of memory devices, after the programming the unique ID into the target memory device is completed; and
programming a unique ID, corresponding to the next target memory device, into the next target memory device.

10. The method of claim 9, further comprising:
exiting the OTP addressing mode after programming a unique ID into each memory device of the plurality of memory devices is completed.

11. The method of claim 10, further comprising:
transmitting information on unique IDs, respectively programmed into the plurality of memory devices, to the memory controller.

12. The method of claim 1, further comprising:
transmitting information on the unique ID, programmed into the target memory device, to the memory controller after the programming the unique ID into the target memory device is completed.

13. The method of claim 12, further comprising:
receiving a mode register write command after a predetermined time has passed from a time point at which the precharge command is received,
wherein the transmitting the information on the unique ID, programmed into the target memory device, to the memory controller is performed during the predetermined time.

14. The method of claim 1, wherein the memory controller and the memory module are configured to communicate with each other through a sideband bus.

15. The method of claim 1, wherein a unique ID corresponding to the target memory device is permanently programmed into an OTP region in the target memory device.

16. A memory module that communicates with a memory controller, the memory module comprising:

a register clock driver configured to receive a command from the memory controller; and
a plurality of memory devices electrically connected to the register clock driver,
wherein each memory device of the plurality of memory devices comprises:
a memory cell array comprising a plurality of memory cells;
a command decoder configured to decode the command received from the memory controller;
a mode register configured to store guard keys having a predetermined order, each guard key having a predetermined value; and
an identifier (ID) storage region configured to, based on entering an active state in response to an active command, and a match between an order and values of a plurality of mode register commands, received from the memory controller, and an order and values of the guard keys stored in the mode register, store information on a unique ID in the ID storage region, and
wherein each memory device is configured to, in response to receiving a precharge command from the memory controller after the information on the unique ID is stored in the ID storage region, release the active state.

17. The memory module of claim 16, wherein the information on the unique ID is obtained based on a plurality of column addresses received from the memory controller.

18. The memory module of claim 16, wherein the ID storage region comprises anti-fuse elements.

19. The memory module of claim 16, wherein each memory device of the plurality of memory devices is configured to transmit the information on the unique ID, stored in the ID storage region, to the memory controller through a loopback operation.

20. A storage device comprising:
a memory module including a plurality of memory devices;
a memory controller configured to control an operation of the memory module and configured to communicate with the memory module through a first bus; and
a baseboard management controller provided separately from the memory module, and configured to communicate with the memory module through a second bus and configured to monitor information on the memory module,
wherein each memory device of the plurality of memory devices comprises:
a memory cell array comprising a plurality of memory cells;
a command decoder configured to decode a command received from the memory controller;
a mode register configured to store guard keys having a predetermined order, each guard key having a predetermined value; and
an identifier (ID) storage region configured to, based on entering an active state in response to an active command, and a match between an order and values of a plurality of mode register commands, received from the memory controller, and an order and values of the guard keys stored in the mode register, store information on a unique ID in the ID storage region, and
wherein each memory device is configured to, in response to receiving a precharge command from the memory controller after the information on the unique ID is stored in the ID storage region, release the active state.

* * * * *